US006975867B2

(12) United States Patent
Ito et al.

(10) Patent No.: US 6,975,867 B2
(45) Date of Patent: Dec. 13, 2005

(54) RADIO BASE APPARATUS, COMMUNICATION CHANNEL ALLOCATION METHOD, AND ALLOCATION PROGRAM

(75) Inventors: Tadayoshi Ito, Gifu (JP); Yoshiharu Doi, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 72 days.

(21) Appl. No.: 10/466,315

(22) PCT Filed: Aug. 26, 2002

(86) PCT No.: PCT/JP02/08590

§ 371 (c)(1),
(2), (4) Date: Jul. 28, 2003

(87) PCT Pub. No.: WO03/021994

PCT Pub. Date: Mar. 13, 2003

(65) Prior Publication Data

US 2004/0082333 A1     Apr. 29, 2004

(30) Foreign Application Priority Data

Aug. 31, 2001 (JP) .............................. 2001-263514
Sep. 18, 2001 (JP) .............................. 2001-283380
Sep. 19, 2001 (JP) .............................. 2001-284401

(51) Int. Cl.[7] ............................................... H04B 7/00
(52) U.S. Cl. .................. 455/450; 455/452.2; 455/509; 370/437
(58) Field of Search ............................ 455/450, 452.1, 455/452.2, 464, 500, 507, 185.1, 560, 509, 455/515; 370/437, 431, 433, 442, 450

(56) References Cited

U.S. PATENT DOCUMENTS

| 5,357,513 | A | * | 10/1994 | Kay et al. | 370/332 |
|---|---|---|---|---|---|
| 5,404,573 | A | * | 4/1995 | Yabe et al. | 455/423 |
| 5,479,410 | A | * | 12/1995 | Paavonen | 370/332 |
| 5,513,183 | A | * | 4/1996 | Kay et al. | 370/337 |
| 5,732,073 | A | * | 3/1998 | Kusaki et al. | 370/280 |
| 5,943,340 | A | * | 8/1999 | Iemura | 370/431 |
| 6,088,345 | A | * | 7/2000 | Sakoda et al. | 370/335 |
| 6,219,347 | B1 | * | 4/2001 | Uchida et al. | 370/347 |
| 6,400,704 | B2 | * | 6/2002 | Mikuni et al. | 370/347 |
| 6,477,384 | B2 | * | 11/2002 | Schroderus et al. | 455/500 |

(Continued)

FOREIGN PATENT DOCUMENTS

GB     2 328 586 A     2/1999

(Continued)

OTHER PUBLICATIONS

N. Kikuma; "*Chapter 3: MMSE Adaptive Array*" in *Adaptive Signal Processing by Array Antenna* (*array antenna ni yoru tekio shingo shori*); Sci Tech Press; Nov. 1998; pp. 35-49/Partial translation.

*Primary Examiner*—CongVan Tran
(74) *Attorney, Agent, or Firm*—Westerman, Hattori, Daniels & Adrian, LLP

(57) ABSTRACT

A signal transmitted and received at an adaptive array base station (1000) is divided into a plurality of frames each including a control slot for a control channel and a plurality of communication slots for speech. Adaptive array base station (1000) includes a reception level sensing unit (50) for monitoring a signal level of a control slot from a peripheral base station, and a channel allocation computing unit (70) for allocating the control slot for information communication in response to a sensing result of reception level sensing unit (50) when a link channel is requested from a terminal device.

22 Claims, 14 Drawing Sheets

U.S. PATENT DOCUMENTS 6,671,495 B1 * 12/2003 Lappetelainen et al. . 455/67.11
6,745,049 B1 * 6/2004 Uchida et al. .............. 455/560

FOREIGN PATENT DOCUMENTS

| | | |
|---|---|---|
| JP | 64-46334 | 2/1989 |
| JP | 4-255123 | 9/1992 |
| JP | 11-32366 | 2/1999 |
| JP | 2000-32529 | 1/2000 |
| WO | WO 200074414 A1 * 12/2000 | ............ H01Q 3/26 |

* cited by examiner

RADIO BASE APPARATUS, COMMUNICATION CHANNEL ALLOCATION METHOD, AND ALLOCATION PROGRAM

TECHNICAL FIELD

The present invention relates to an apparatus for a radio base station, and a method and a program of controlling communication channel allocation in a mobile communication system.

BACKGROUND ART

In a mobile communication system (such as Personal Handyphone System: abbreviated as PHS hereinafter) rapidly developed in recent years, a base station is practically used which enables transmission and reception with directivity by performing so-called adaptive array processing using an array antenna formed with a plurality of antennas to attain a good communication quality.

With this adaptive array processing by the array antenna, a communication system called PDMA (Path Division Multiple Access) system or SDMA (Space Division Multiple Access) system also becomes feasible wherein a spatial multiple access of wireless terminals (terminals or personal stations) of a plurality of users to a radio base station (base station or cellular station) is possible by spatially dividing a time slot of the same frequency to enhance utilization efficiency of radio wave frequency.

According to such adaptive array technology, an up-link signal from an antenna on each user terminal is received by an array antenna on a base station, and is separated and extracted with reception directivity by the adaptive array processing. On the other hand, a down-link signal from the base station to the terminal is transmitted from the array antenna with transmission directivity to the antenna on the terminal.

Since such adaptive array processing is a well-known technology and is described in detail in, for example, reference 1: "Chapter Three: MMSE Adaptive Array" (pp. 35–49) in "ARRAY ANTENNA NIYORU TEKIOUSHINGOUSYORI (Adaptive Signal Processing by Array Antenna)" by Nobuyoshi Kikuma (Sci Tech Press), the operating principles thereof will not be described herein.

In the following description, the base station performing down-link transmission directivity control for the terminal using such adaptive array processing is referred to as "an adaptive array base station".

As the communication system of the above-described PHS, TDMA system is adopted, wherein a frame (5 ms) consisting of respective four slots (one slot: 625 μs) for transmission and reception is used as a base unit. SDMA system uses the same frame structure. This communication system of PHS is standardized, for example, as "a second generation cordless telephone system".

FIG. 13 is a schematic diagram showing a structure of a signal transmitted and received between a terminal and a PHS base station.

A signal of one frame is divided into eight slots and, for example, the former four slots are used for reception while the latter four slots are used for transmission. Each slot includes 120 symbols.

In the PHS system, a prescribed number of frames such as 20 frames, each having such a structure, form one cycle. That is, in the PHS system, one base station communicates with a terminal within its service area using a control channel once in every prescribed number of frames such as once in every 20 frames, and the terminal obtains information such as whether the terminal can make a call at the present position.

In the frame structure shown in FIG. 13, a set of one slot for reception and one slot for transmission is allocated to the control channel while the remaining three sets of slots are respectively allocated to traffic channels for three users, for example, in the first frame of the 20 frames cycle.

In each of the other 19 frames, the set of slots corresponding to the control channel is kept empty, and the remaining three sets are successively allocated to the traffic channels for three users.

During a control procedure of synchronization establishment in the PHS system, a link channel is first established by the control channel, followed by interference wave (U wave: Undesired wave) measurement processing and setting of a traffic condition with an allocated channel, and then a speech starts. Such a procedure is disclosed in detail in a standard of PHS, that is, a second generation cordless telephone system standard RCR STD-28 (issued by Association of Radio Industries and Businesses).

FIG. 14 shows such a traffic sequence flow of the PHS system. Brief description thereof will be given referring to FIG. 14.

First, a link channel establishment request signal (LCH establishment request signal) is transmitted from a PHS terminal to a base station using a C channel (control channel: CCH). The PHS base station detects (carrier sense) an empty channel (empty traffic channel: empty T channel) and, using the C channel, transmits to the PHS terminal a link channel allocation signal (LCH allocation signal) specifying the empty T channel.

At the PHS terminal, a measurement (U wave measurement) is performed to determine if the specified T channel receives an interference wave signal having power equal to or higher than a certain value, based on the link channel information received from the PHS base station. When the interference wave signal having power equal to or higher than the certain value is not detected, that is, when the specified T channel is not used by another PHS base station, a synchronous burst signal is transmitted to the base station using the specified T channel, and then the base station transmits the synchronous burst signal back to the terminal to complete the establishment of synchronization.

On the other hand, when the interference wave signal having power equal to or higher than the certain value is detected, that is, when the specified T channel is used by another PHS base station, the PHS terminal repeats the control procedure by again transmitting the link channel establishment request signal.

In the PHS system, a connection of a communication channel between a terminal and a base station is performed as such using a channel with a small interference wave which can obtain a good communication characteristic.

When the control channel CCH is used for communication only in one frame of 20 frames cycle, for example, and is kept empty in the remaining 19 frames as described above, however, utilization efficiency of radio wave decreases. The efficiency is especially low in a condition of heavy traffic.

Though it is possible to use slots for the control channel in the above-mentioned remaining 19 frames for speech communication, as the normal communication using the control channel is performed once in every 20 frames, communication data of the traffic channel allocated to the slot is interrupted once in every 20 frames (once in every 100 ms) in this situation. This causes noise, and thus a speech quality is degraded.

Therefore, an object of the present invention is to provide an apparatus for a radio base station, and a method and a program of controlling communication channel allocation which can enhance the utilization efficiency of radio wave in a mobile communication system wherein a plurality of terminals are connected to a base station.

DISCLOSURE OF THE INVENTION

An aspect of the present invention discloses an apparatus for a radio base station in a mobile communication system, wherein a signal transmitted and received in the mobile communication system is divided into a plurality of frames each including a control slot for transferring at least one control signal and a plurality of communication slots for information communication. The apparatus includes reception level sensing means for monitoring a signal level of a control slot from a peripheral base station, and channel allocation means for allocating the control slot for the information communication in response to a sensing result of the reception level sensing means when a connection is requested from a terminal device.

When there is no empty communication slot of the radio base station, the channel allocation means preferably allocates the control slot for the information communication in response to a presence of at least a prescribed number of other peripheral base stations capable of receiving signals of the control slots, which presence is determined from a sensing result of the reception level sensing means.

When there is no empty communication slot of the radio base station, the channel allocation means preferably allocates the control slot for the information communication in response to a signal level of the control slot from another peripheral base station being equal to or higher than a prescribed value, which signal level is determined from a sensing result of the reception level sensing means.

Another aspect of the present invention discloses a communication channel allocation method in an apparatus for a radio base station in a mobile communication system, wherein a signal transmitted and received in the mobile communication system is divided into a plurality of frames each including a control slot for transferring at least one control signal and a plurality of communication slots for information communication. The method includes the steps of: monitoring a signal level of a control slot from a peripheral base station; and allocating the control slot for the information communication in response to a sensing result of reception level when a connection is requested from a terminal device.

The allocating step preferably includes the steps of searching for an empty communication slot of the radio base station and, when there is no empty communication slot of the radio base station, allocating the control slot for the information communication in response to a presence of at least a prescribed number of other peripheral base stations capable of receiving signals of the control slots.

The allocating step preferably includes the steps of searching for an empty communication slot of the radio base station and, when there is no empty communication slot of the radio base station, allocating the control slot for the information communication in response to a signal level of the control slot from another peripheral base station being equal to or higher than a prescribed value.

A further aspect of the present invention discloses a communication channel allocation program in an apparatus for a radio base station in a mobile communication system, wherein a signal transmitted and received in the mobile communication system is divided into a plurality of frames each including a control slot for transferring at least one control signal and a plurality of communication slots for information communication. The program makes a computer execute the steps of: monitoring a signal level of a control slot from a peripheral base station; and allocating the control slot for the information communication in response to a sensing result of reception level when a connection is requested from a terminal device.

The allocating step preferably includes the steps of searching for an empty communication slot of the radio base station and, when there is no empty communication slot of the radio base station, allocating the control slot for the information communication in response to a presence of at least a prescribed number of other peripheral base stations capable of receiving signals of the control slots.

The allocating step preferably includes the steps of searching for an empty communication slot of the radio base station and, when there is no empty communication slot of the radio base station, allocating the control slot for the information communication in response to a signal level of the control slot from another peripheral base station being equal to or higher than a prescribed value.

A further aspect of the present invention discloses an apparatus for a radio base station in a mobile communication system, wherein a signal transmitted and received in the mobile communication system is divided into a plurality of frames each including at least one control slot for transferring a control signal and a plurality of communication slots for information communication. The apparatus includes reception level sensing means for monitoring a signal level and reception timing of a control slot from a peripheral base station, channel allocation means for allocating the control slot for the information communication in response to a sensing result of the reception level sensing means when a connection is requested from a terminal device, storing means for storing the sensing result of the reception level sensing means when a connection is requested from the terminal device, and control means for resuming transmission of the control signal based on the sensing result stored in the storing means in response to an occurrence of an empty slot within the frame after the control slot is allocated for the information communication.

When the empty slot is the control slot, the control means preferably synchronizes sending timing of a signal of the control slot with the peripheral base station based on the sensing result stored in the storing means to resume transmission of the control signal.

When the empty slot is not the control slot, the control means preferably i) reallocates a terminal performing the information communication in the control slot to the empty slot, and ii) synchronizes sending timing of a signal of the control slot with the peripheral base station based on the sensing result stored in the storing means to resume transmission of the control signal.

A further aspect of the present invention discloses a communication channel allocation method in an apparatus for a radio base station in a mobile communication system, wherein a signal transmitted and received in the mobile communication system is divided into a plurality of frames each including a control slot for transferring at least one control signal and a plurality of communication slots for information communication. The method includes the steps of: monitoring a signal level and reception timing of a control slot from a peripheral base station; allocating the control slot for the information communication in response to the signal level of the control slot from the peripheral base station when a connection is requested from a terminal device; storing the signal level and the reception timing of the control slot from the peripheral base station when a connection is requested from the terminal device; and resuming transmission of the control signal based on the stored signal level and the reception timing of the control slot from the peripheral base station in response to an occurrence of an empty slot within the frame after the control slot is allocated for the information communication.

When the empty slot is the control slot, the resuming step preferably includes the step of synchronizing sending timing of a signal of the control slot with the peripheral base station based on the stored signal level and the reception timing of the control slot from the peripheral base station to resume transmission of the control signal.

When the empty slot is not the control slot, the resuming step preferably includes the steps of reallocating a terminal performing the information communication in the control slot to the empty slot, and synchronizing sending timing of a signal of the control slot with the peripheral base station based on the sensing result stored in the storing means to resume transmission of the control signal.

A further aspect of the present invention discloses a communication channel allocation program in an apparatus for a radio base station in a mobile communication system, wherein a signal transmitted and received in the mobile communication system is divided into a plurality of frames each including a control slot for transferring at least one control signal and a plurality of communication slots for information communication. The program makes a computer execute the steps of: monitoring a signal level and reception timing of a control slot from a peripheral base station; allocating the control slot for the information communication in response to the signal level of the control slot from the peripheral base station when a connection is requested from a terminal device; storing the signal level and the reception timing of the control slot from the peripheral base station when a connection is requested from the terminal device; and resuming transmission of the control signal based on the stored signal level and the reception timing of the control slot from the peripheral base station in response to an occurrence of an empty slot within the frame after the control slot is allocated for the information communication.

When the empty slot is the control slot, the resuming step preferably includes the step of synchronizing sending timing of a signal of the control slot with the peripheral base station based on the stored signal level and the reception timing of the control slot from the peripheral base station to resume transmission of the control signal.

When the empty slot is not the control slot, the resuming step preferably includes the steps of reallocating a terminal performing the information communication in the control slot to the empty slot, and synchronizing sending timing of a signal of the control slot with the peripheral base station based on the sensing result stored in the storing means to resume transmission of the control signal.

A further aspect of the present invention discloses an apparatus for a radio base station in a mobile communication system, wherein a signal transmitted and received in the mobile communication system is divided into a plurality of frames each including at least one control slot for transferring a control signal and a plurality of communication slots for information communication. The apparatus includes a plurality of antennas, reception directivity control means for separating a signal from a desired terminal device by adaptive array processing based on signals from the plurality of antennas, and control means for allocating the control slot for the information communication when connections are requested from terminal devices which are equal to or larger in number than the capacity of the communication slot. When the control slot is allocated for the information communication, the reception directivity control means controls the reception directivity with a prescribed number of the plurality of antennas, and receives the control signal with the remaining antenna(s).

It is preferable that the apparatus for radio base station further includes transmission directivity control means for producing a transmission signal having directivity for a desired terminal device by the adaptive array processing. When the control slot is allocated for the information communication, the transmission directivity control means controls transmission directivity with a prescribed number of the plurality of antennas, and transmits the control signal with the remaining antenna(s).

A further aspect of the present invention discloses a communication channel allocation method in an apparatus for a radio base station which transmits and receives a signal having directivity with a desired terminal device by adaptive array processing based on signals from a plurality of antennas, wherein a signal transmitted and received in a mobile communication system is divided into a plurality of frames each including a control slot for transferring at least one control signal and a plurality of communication slots for information communication. The method includes the steps of: allocating the control slot for the information communication in response to a signal level of the control slot from a peripheral base station when a connection is requested from a terminal device; and controlling transmission and reception directivity with a prescribed number of the plurality of antennas while receiving the control signal with the remaining antenna(s) when the control slot is allocated for the information communication.

A further aspect of the present invention discloses a communication channel allocation program in an apparatus for a radio base station which transmits and receives a signal having directivity with a desired terminal device by adaptive array processing based on signals from a plurality of antennas in a mobile communication system, wherein a signal transmitted and received in the mobile communication system is divided into a plurality of frames each including a control slot for transferring at least one control signal and a plurality of communication slots for information communication. The program makes a computer execute the steps of: allocating the control slot for the information communication in response to a signal level of the control slot from a peripheral base station when a connection is requested from a terminal device; and controlling transmission and reception directivity with a prescribed number of the plurality of antennas while receiving the control signal with the remaining antenna(s) when the control slot is allocated for the information communication.

BEST MODES FOR CARRYING OUT THE INVENTION

[First Embodiment]

A first embodiment of the present invention will now be described in detail with reference to the drawings.

Figure 1:
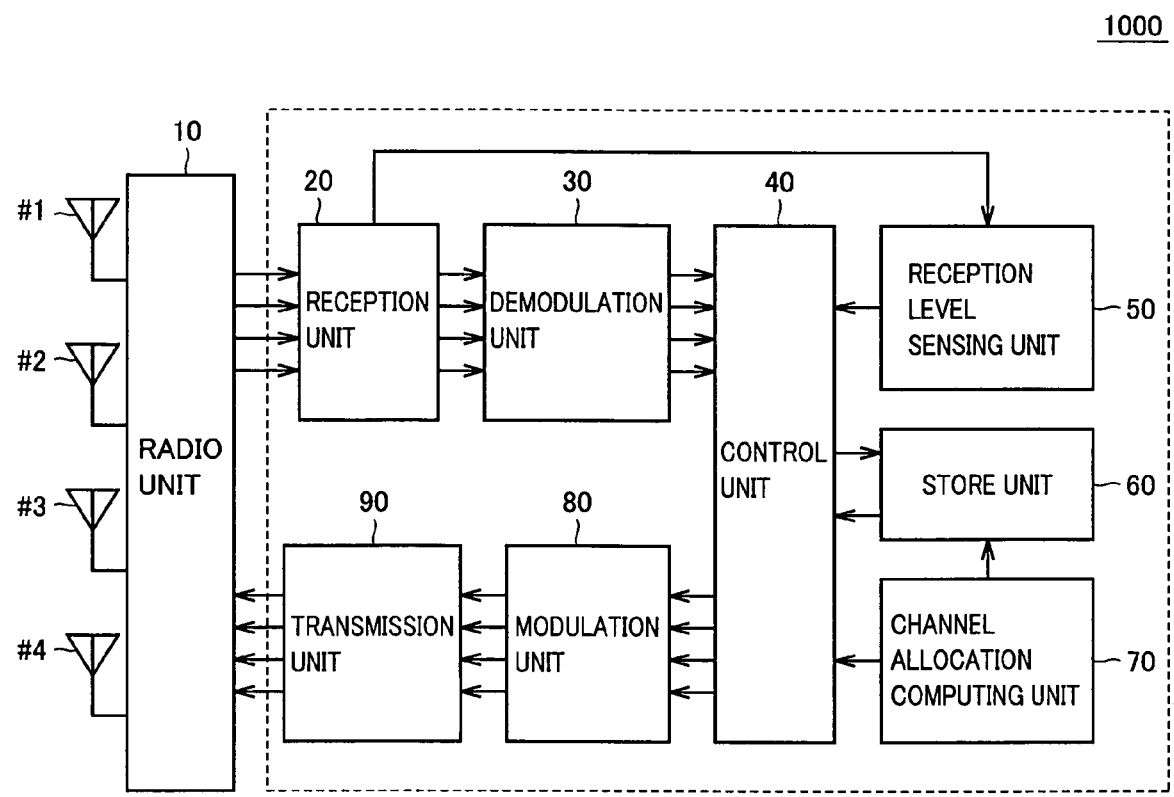
FIG. 1 is a schematic block diagram showing a configuration of an adaptive array base station 1000 according to first and second embodiments of the present invention.

FIG. 1 is a schematic block diagram showing a configuration of an adaptive array base station 1000 according to the embodiment of the present invention. Though base station 1000 according to the present invention is described as an adaptive array base station in the following description, the present invention is not limited to the adaptive array base station. The present invention is applicable to a base station of a mobile communication system wherein both a communication channel for information communication of a user such as a speech and a control channel for controlling, for example, a link establishment are allocated to a plurality of slots in one frame.

On the other hand, the present invention is applicable to a base station communicating in SDMA system, wherein a spatial multiple access is possible, as long as it is an adaptive array base station.

Referring to FIG. 1, adaptive array base station 1000 includes an array antenna formed with a plurality of antennas such as antennas #1–#4.

Antennas #1–#4 are respectively connected to a radio unit 10.

During reception, signals received at antennas #1–#4 are fed to a reception unit 20 via radio unit 10. Therein, various analog signal processing such as amplification, frequency conversion and so on is performed on the received signals fed to reception unit 20, and the signals are then converted to digital signals by an A/D converters (not shown). Furthermore, a signal of each user is separated and extracted in reception unit 20 by adaptive array processing controlled with a control unit 40. The received signal of each user which is separated and extracted is then fed to a demodulation unit 30, and required demodulation, processing and time-division processing are performed to reconstruct the original signal, and then the result is output to a public network (not shown).

A reception level sensing unit 50 receives a signal from reception unit 20 and, as will be described below, outputs to control unit 40 a power level (reception level) of each received signal at antennas #1–#4, especially the received signal of control channel CCH from another base station.

As will be described below, when a link channel (LCH) establishment request is received from a terminal within a service area of base station 1000, a store unit 60 receives and stores information from control unit 40 such as a slot number of control channel CCH, transmission timing of a frame and so on, which information will be necessary for base station 1000 to resume transmission of control channel CCH after the control channel is allocated as a traffic channel (TCH).

When a link channel (LCH) establishment request is received from a terminal, a channel allocation computing unit 70 determines whether there is an empty traffic channel and whether control channel CCH can be allocated as a traffic channel, and notifies control unit 40 of the result while storing channel allocation information in store unit 60.

During transmission, on the other hand, a transmission signal provided from the public network (not shown) is fed to a modulation unit 80 via control unit 40. Required time-division processing and modulation processing are performed, and the result is fed to a transmission unit 90. In transmission unit 90, down-link transmission directivity to the signal to be transmitted is controlled by adaptive array processing. The signal is converted to an analog signal by a D/A converter (not shown), and various analog signal processing necessary for radio transmission such as amplification, frequency conversion and so on is performed.

On transmission, signals from transmission unit 90 are fed to antennas #1–#4 via radio unit 10 and are transmitted to a desired terminal from antennas #1–#4.

Figure 2:
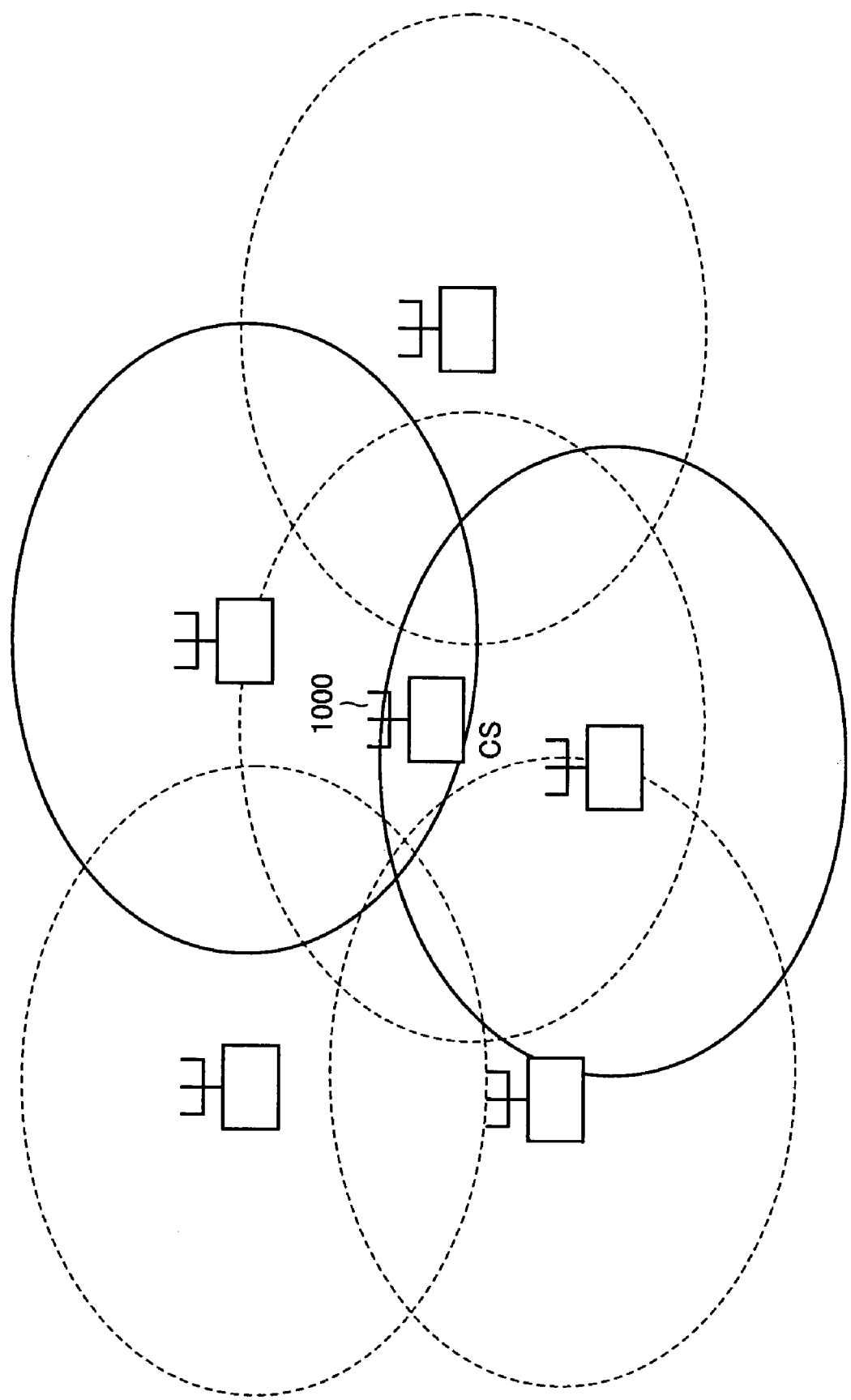
FIG. 2 is a first schematic diagram showing a state of radio waves of base station 1000 and peripheral base stations.

FIG. 2 is a first schematic diagram showing a state of radio waves of base station 1000 and peripheral base stations.

In base station 1000, when a link channel (LCH) establishment request is received from a terminal within a service area of base station 1000, the number of peripheral base stations transmitting signals of control channels CCHs at receivable level and level of individual control channel CCH received from the peripheral base station are determined.

FIG. 2 shows, in a solid line, coverage of radio wave of a base station which is transmitting a signal of control channel CCH receivable at the position of base station 1000. Thus, in FIG. 2, signals of control channels CCHs from two out of five peripheral base stations are receivable at the position of base station 1000.

Figure 3:
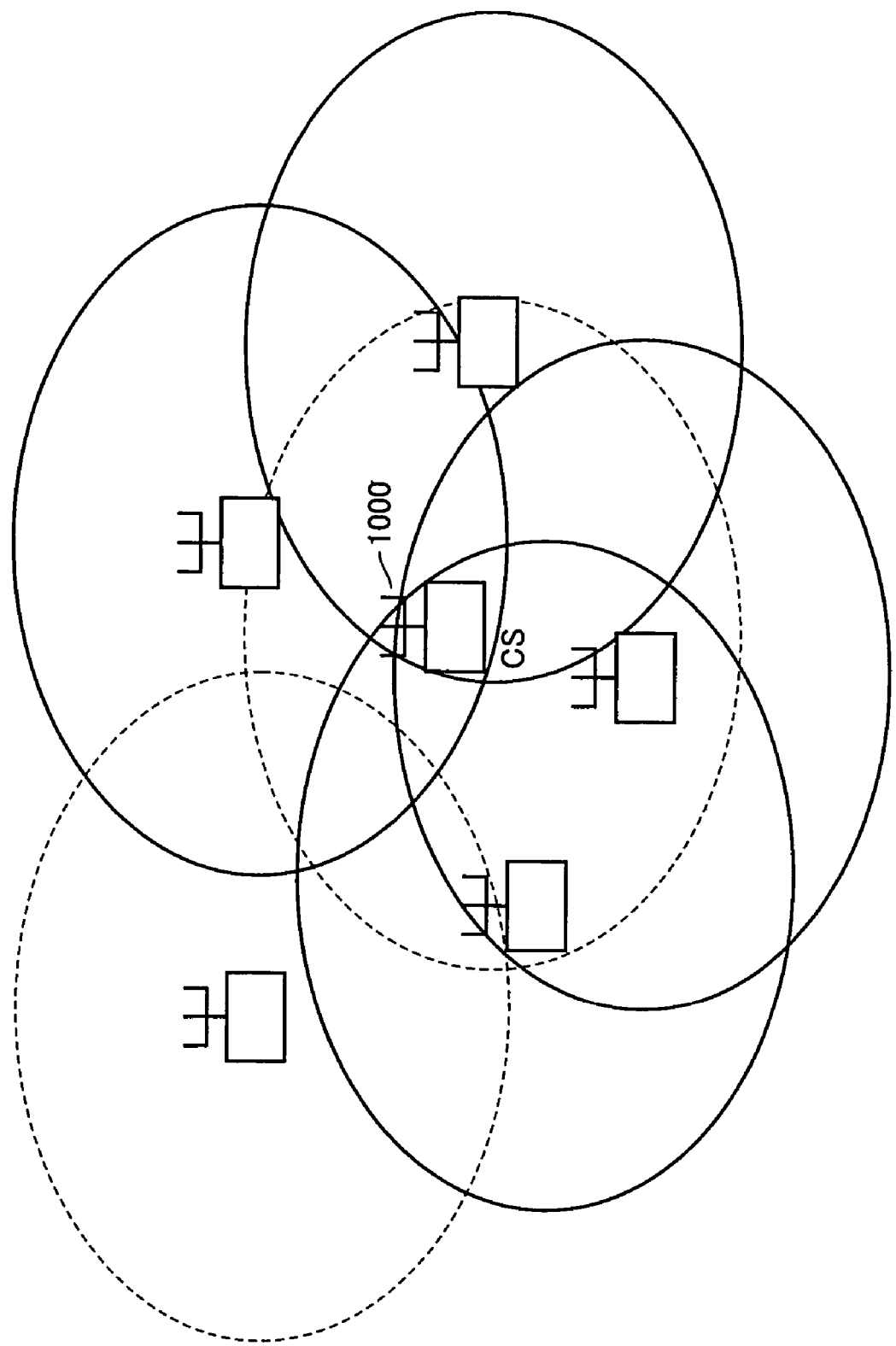
FIG. 3 is a second schematic diagram showing a state of radio waves of base station 1000 and peripheral base stations.

FIG. 3 is a second schematic diagram showing a state of radio waves of base station 1000 and peripheral base stations.

Base stations are arranged in higher density in a heavy traffic area such as an urban area.

Therefore, compared to FIG. 2, the situation may be such that, signals of control channels CCHs from, for example, four out of five peripheral base stations are receivable at the position of base station 1000 where base stations are arranged in higher density as shown in FIG. 3.

In such a situation, there will be no problem in providing services even when normal communication of control channel CCH is stopped in base station 1000 and control channel CCH is shifted to traffic channel in all 20 frames, for example, and when a terminal other than the terminal currently connecting to base station 1000 is to originate a new call, because a control signal of a control channel from another peripheral base station can be received within the service area of base station 1000.

On the other hand, when base stations are arranged in low density and the service areas are not overlapping much, that is, when there is no or only a few base stations around base station 1000, the terminal to originate a new call will not be served at that position if normal communication of control channel CCH is stopped and control channel CCH is shifted to traffic channel in all of the frames in base station 1000, because this is the same situation for that terminal as it is out of the service area.

Therefore, as will be described below, when the link channel (LCH) establishment request is received from a terminal, channel allocation computing unit 70 of base station 1000 not only determines whether there is an empty traffic channel, but also determines whether control channel CCH of base station 1000 can be allocated as a traffic channel, based on the number of peripheral base stations transmitting receivable signals of control channels CCHs or a level of control channel CCH received from a peripheral base station.

Figure 4:
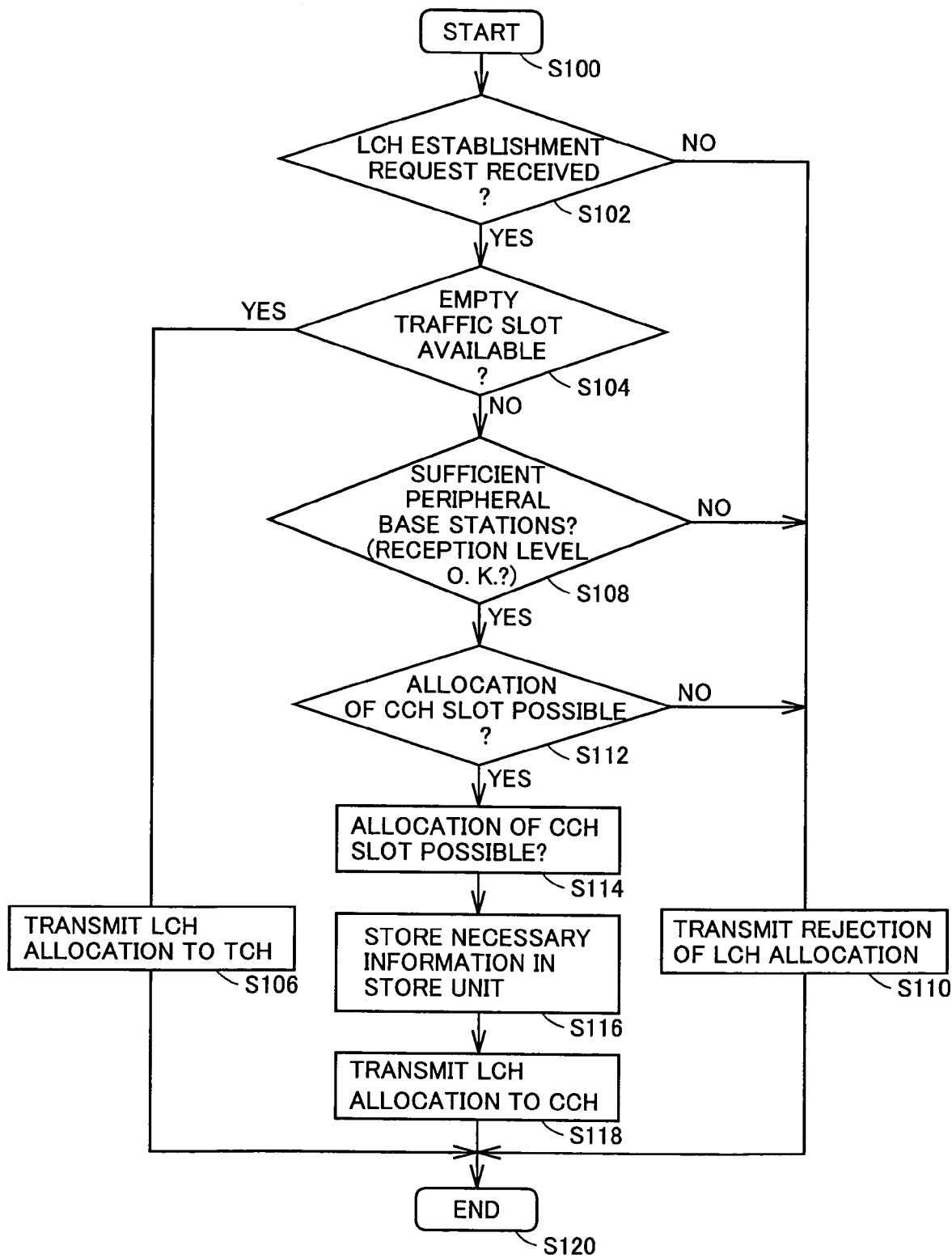
FIG. 4 is a flow chart showing operations executed by a channel allocation computing unit 70 of adaptive array base station 1000.

FIG. 4 is a flow chart showing operations executed by channel allocation computing unit 70 of adaptive array base station 1000 for channel allocation.

This processing can also be performed by a digital signal processor (DSP) within base station 1000, which is not shown, based on software according to the flow chart shown in FIG. 4. The DSP reads a program including each step of the flow chart shown in FIG. 4 from a memory, which is not shown, and executes the same. This program can also be downloaded from a center, which is not shown, via a public circuit.

Referring to FIG. 4, after the channel allocation processing is started (step S100), a determination is made as to whether a link channel (LCH) establishment request exists (step S102). If the LCH establishment request is not received, rejection of link channel allocation is transmitted (step S110). If the LCH establishment request is received, however, a determination is made as to whether an empty traffic slot exists (step S104).

If an empty traffic slot exists, an allocation of the link channel to a traffic channel (TCH) is transmitted (step S106), and the allocation processing is completed (step S120).

On the other hand, if an empty traffic slot does not exist, a determination is made if there are at least a prescribed number of, for example, at least three peripheral base stations each transmitting a signal of control channel CCH at a receivable level (step S108). The "prescribed number" of base station is previously stored in store unit 60.

If at least the prescribed number of peripheral base stations which meet the condition do exist, processing continues in step S112. If the prescribed number of peripheral base stations do not exist, rejection of link channel allocation is transmitted in step S110.

The condition may be an existence of individual control channel CCH having relatively high level, at least a prescribed level, in control channels CCHs received from peripheral base stations, rather than the existence of at least a prescribed number of peripheral base stations with receivable control channel signals. If the condition is met, processing may continue in step S112, and if neither of the conditions is met, rejection of link channel allocation may be transmitted in step S110. This "prescribed level" is also previously stored in store unit 60.

Therefore, if at least one of the conditions is met, that is, if there are many peripheral base stations with receivable signals even if the reception levels are relatively low, or if there are only a few peripheral base stations but they have signals with relatively high reception levels, then it is determined that a new terminal can be served by one of these peripheral base stations even when normal transmission of control channel CCH is stopped and control channel CCH is shifted to a traffic channel.

When the condition in step S108 is met, a determination is made as to whether the control channel can be allocated to the traffic channel in current timing or the like (step S112). If the allocation is not possible, rejection of link channel allocation is transmitted (step S110).

If the control channel can be allocated to the traffic channel, on the other hand, transmission of control channel CCH from base station 1000 is stopped (step S114), and then information that will be necessary for base station 1000 to resume the transmission of control channel CCH, such as a slot number of control channel CCH and transmission timing of a frame at the time just before the switching to the traffic channel, is stored in store unit 60 (step S116).

Thereafter, base station 1000 transmits allocation of the link channel to control channel CCH to the terminal which transmitted the link channel allocation request (step S118), and the processing is completed (step S120).

As described above, according to the first embodiment of the present invention, utilization efficiency of radio wave can be enhanced because the number of terminals connectable to a base station can increase without degrading service quality to a terminal other than the terminals currently connecting to the base station in a mobile communication system wherein both a traffic channel and a control channel exist within one frame.

[Second Embodiment]

A configuration of a second embodiment described below is such that, in addition to the stopped transmission of control channel CCH and allocation processing of traffic channel according to the first embodiment, the channel allocation form can return to the original form when an original traffic channel becomes empty thereafter.

As base station 1000 according to the second embodiment of the present invention has substantially the same structure as base station 1000 in the first embodiment shown in FIG. 1, the structure thereof is not shown. Only the functionally different points are described in the following.

As described in the first embodiment, reception level sensing unit 50 shown in FIG. 1 detects a reception level of control channel CCH from another peripheral base station as well as reception timing thereof, and outputs the result to control unit 40.

As also described in the first embodiment, store unit 60 stores information such as a slot number of control channel CCH which is communicated by base station 1000 itself and transmission timing of a frame. At the same time, store unit 60 receives from control unit 40 and stores information relating to a signal state of control channel CCH of a peripheral base station, such as a reception level and reception timing of control channel CCH from the peripheral base station.

When an original traffic channel becomes empty after control channel CCH is allocated as a traffic channel, base station 1000 performs return processing as will be described below and returns to the original channel allocation state, wherein the speech signal is communicated with three sets of slots and the control signal is communicated with one set of slots within one frame.

Figure 5:
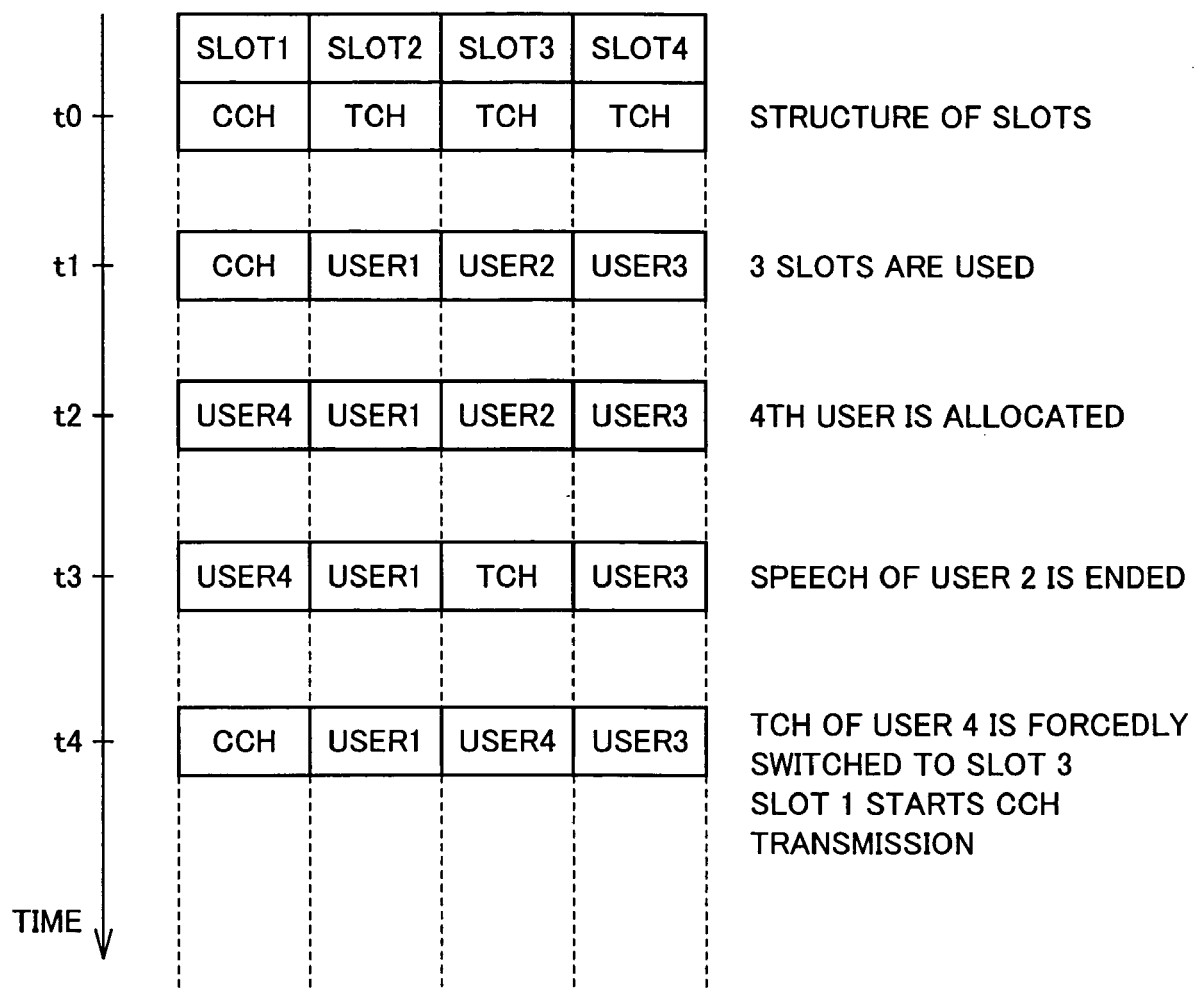
FIG. 5 schematically shows flows in processing of allocating a control channel as a traffic channel and processing of resuming communication of the control channel.

FIG. 5 schematically shows flows in processing of allocating control channel CCH as a traffic channel (processing of the above-described first embodiment) and processing of returning communication of the control channel (unique processing of the second embodiment).

In FIG. 5, a vertical axis indicates time and a horizontal axis indicates a structure of slots within one frame such as slots for down-link communication.

Referring to FIG. 5, at time t0, a top slot 1 is allocated to control channel CCH, and the remaining slots 2–4 are allocated to traffic channels TCHs.

At time t1 in this state, users 1–3 are respectively using slots 2–4 for calls.

Based on a link channel establishment request from a fourth user 4, when the condition such as a level of control channel signal from a peripheral base station is met as described referring to FIG. 2, slot 1, which was used for communication of the control channel, is then allocated for a speech signal of user 4 at time t2.

Thereafter, it is assumed that a speech of user 2 who was using slot 3 is completed and slot 3 becomes empty at time t3.

Base station 1000 then directs user 4 using slot 1 to switch the channel at time t4, and user 4 starts a speech in the emptied slot 3. At the same time, base station 1000 resumes communication of the control channel using slot 1, based on the traffic slot number of the control channel and transmission timing of the control channel which was transmitted by base station 1000 itself, which information was stored in store unit 60 when slot 1 for the control channel was allocated to user 4 at time t2.

Figure 6:
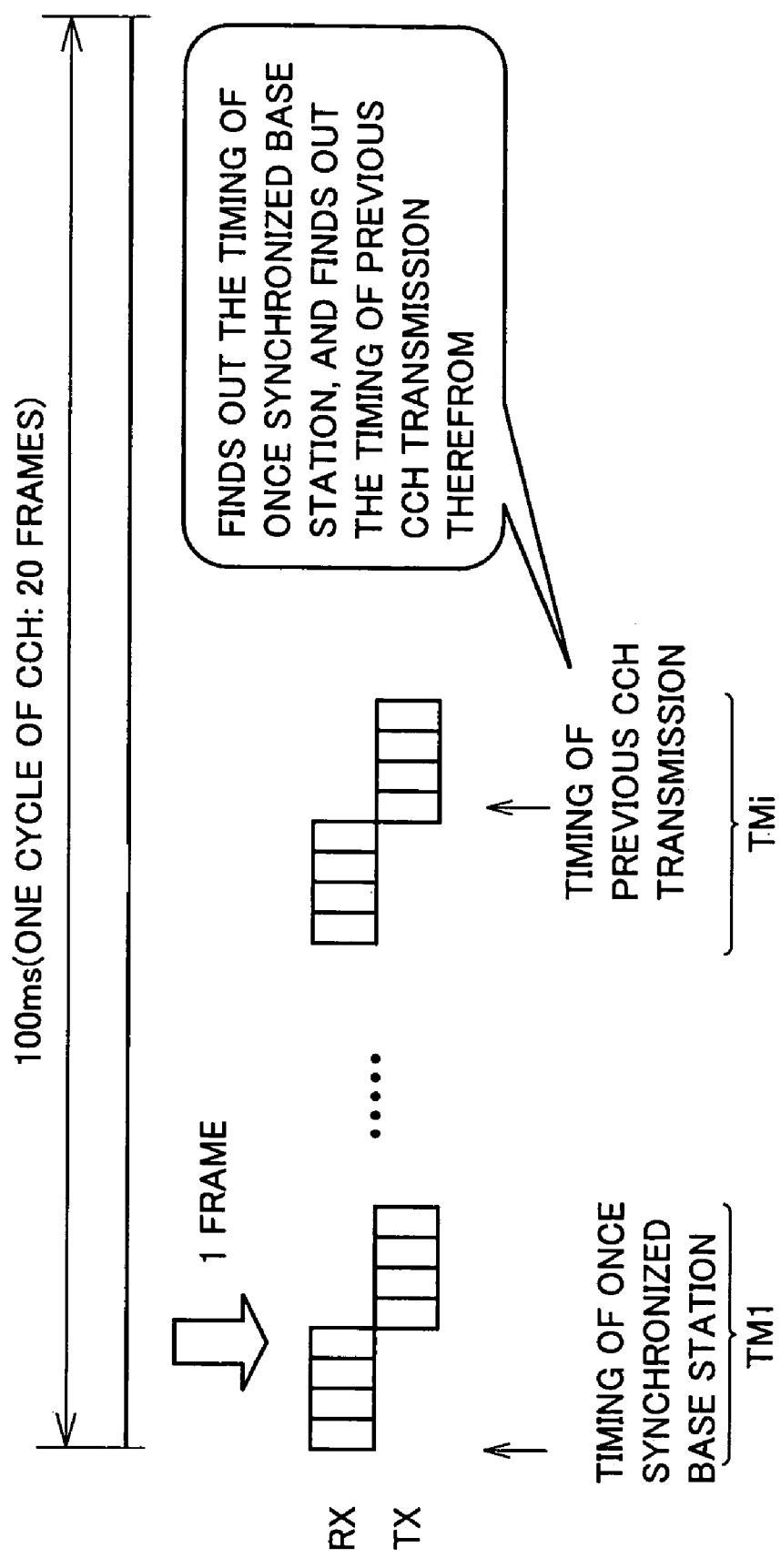
FIG. 6 is a schematic diagram showing transmission timing of the control channel.

FIG. 6 is a schematic diagram showing transmission timing of the control channel.

As shown in FIG. 6, base station 1000 performs transmission in the control channel in a cycle of 20 frames (100 msec), for example, in PHS system. A user of base station 1000 can obtain information about a possibility to receive the service, such as information of radio wave intensity, from a signal of the control channel transmitted once in every cycle.

As shown in FIG. 2, a plurality of base stations are arranged around base station 1000, and these peripheral base stations also transmit signals of control channels CCHS. Thus, base station 1000 and peripheral base stations synchronize with each other, and each transmits the signal of control channel CCH in inherent timing for each base station within one cycle of control channel shown in FIG. 6.

In the example shown in FIG. 6, base station 1000 was transmitting a signal of control channel CCH in timing TMi within one cycle of the control channel before the control channel is allocated to the traffic channel.

When a traffic channel becomes empty and the transmission of the control channel is resumed, base station 1000 detects transmission timing such as TM1 of a peripheral base station with which base station 1000 was synchronizing for the transmission of the control channel as described above and, in principle, finds out from the detected transmission timing the transmission timing of control channel CCH which was previously transmitted by base station 1000, to resume the transmission of the signal of the control channel in the thus found previous transmission timing.

Figure 7:
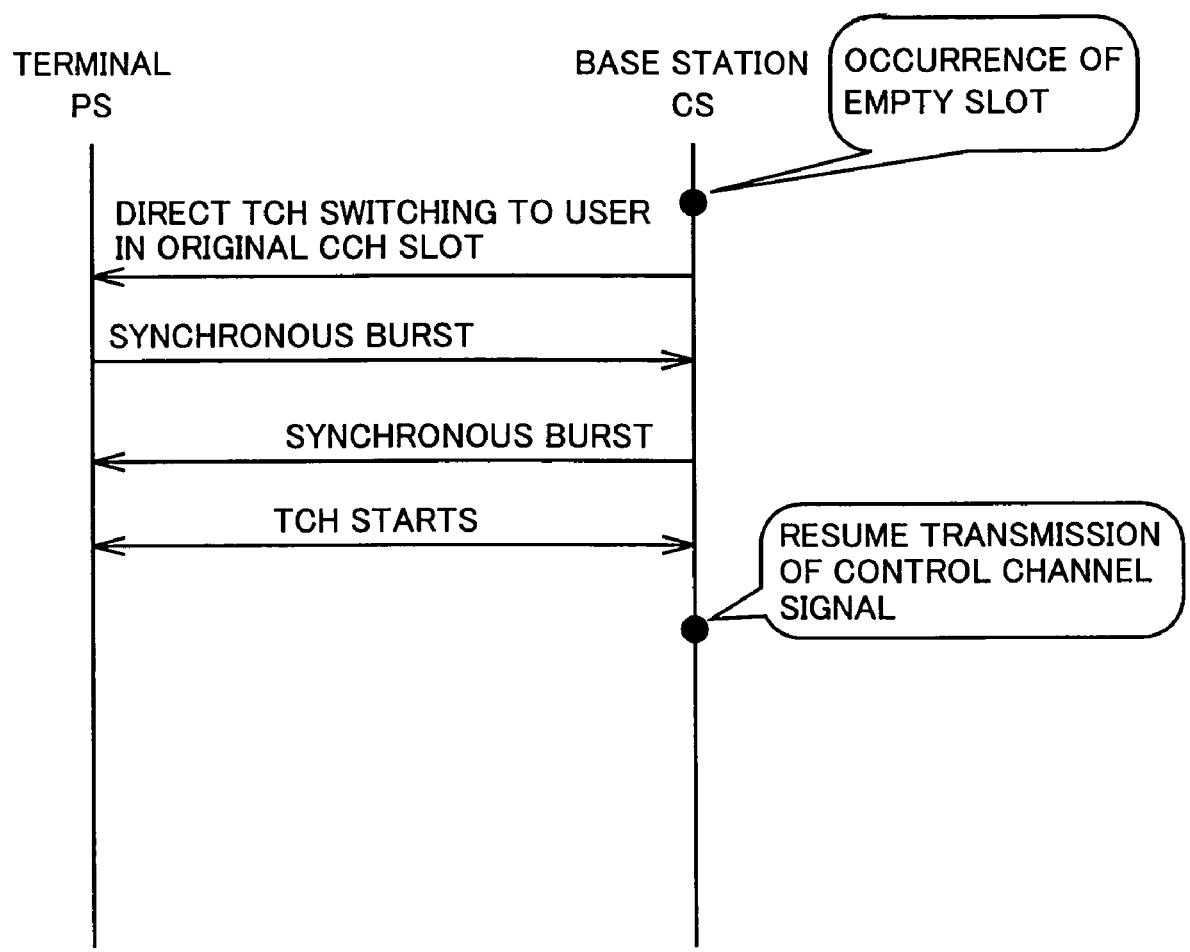
FIG. 7 is a flow chart showing processing of resuming transmission of a signal of the control channel shown in FIG. 5 in more detail.

FIG. 7 is a flow chart showing processing of resuming transmission of the signal of the control channel shown in FIG. 5 in more detail.

Referring to FIGS. 5 and 7, when a slot other than the slot for previously-used control channel (slot 3) becomes empty at time t3, base station 1000 directs a terminal PS of user 4 using the slot originally for the control channel (slot 1) to switch traffic channel TCH.

In terminal PS, a synchronous burst signal is transmitted to the base station using the specified traffic slot 3, and the base station also transmits the synchronous burst signal to the terminal to complete the establishment of synchronization.

Thereafter, user 4 communicates with base station 1000 using the newly established traffic channel.

In base station 1000, transmission of the signal of the control channel is resumed based on information of the previously transmitted control channel. The resume processing is performed using information for the state (reception level, reception timing) of the signal of control channel CCH of a peripheral base station and data such as the traffic slot number of the control channel and transmission timing of the control channel, which are stored in store unit 60.

When the transmission of the signal of the control channel is resumed, however, there may be an exceptional situation wherein reception level sensing unit 50 senses that the state of a peripheral base station has changed such that, for example, a signal of a control channel from the previously synchronized base station cannot be received, or there is a new peripheral base station from which a signal of a control channel is received. In such a situation, base station 1000 performs processing to synchronize with the peripheral base station again based on the state (reception level, reception timing) of the signal of control channel CCH of the peripheral base station, which state is stored in store unit 60, and then resumes transmission of the signal of control channel CCH in inherent timing for base station 1000 within one cycle of the control channel.

Figure 8:
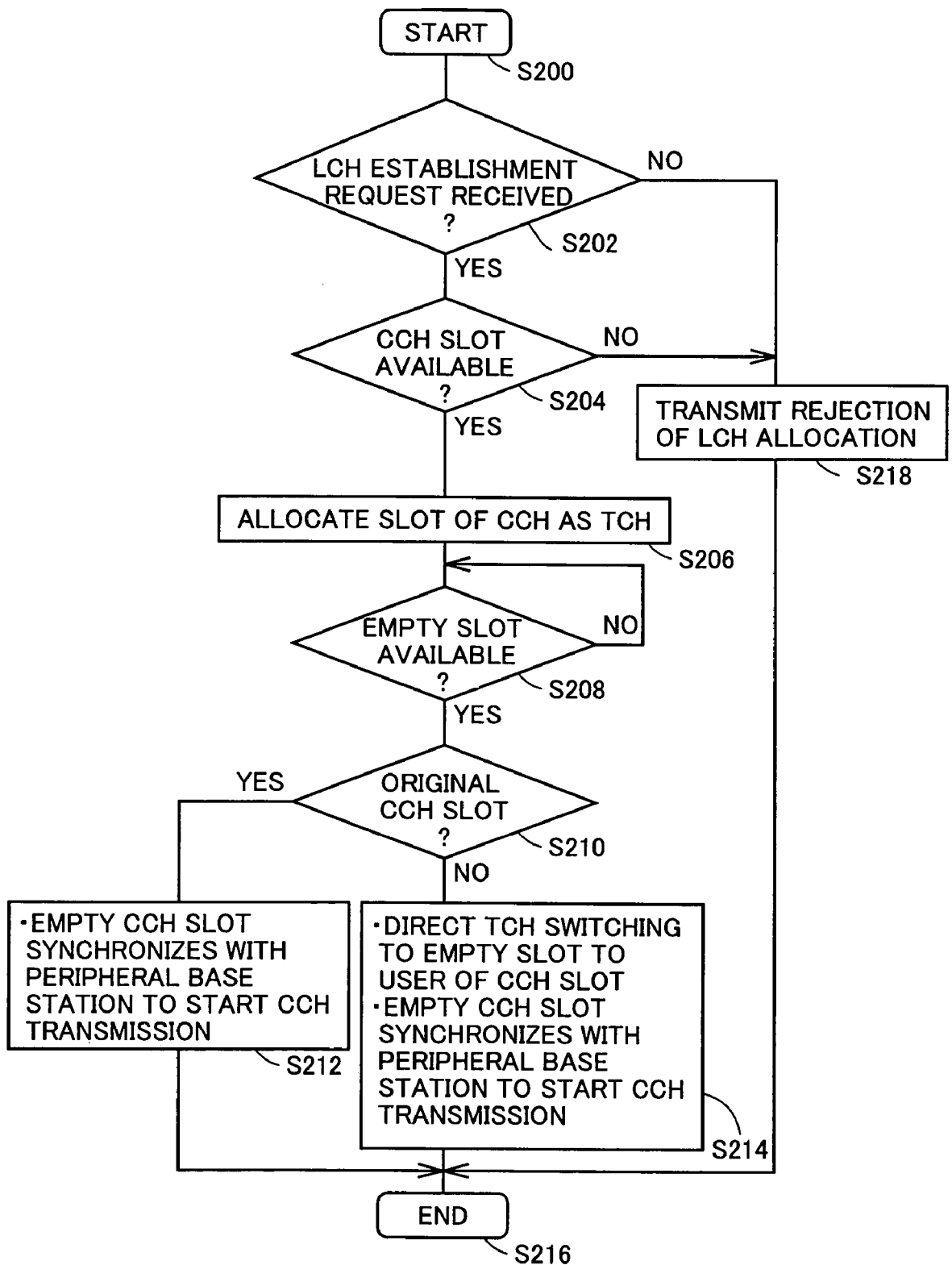
FIG. 8 is a flow chart showing operations executed by a control unit 40 and channel allocation computing unit 70.

FIG. 8 is a flow chart showing operations executed by control unit 40 and channel allocation computing unit 70 of adaptive array base station 1000 for processing of allocating the control channel to the traffic channel and processing of resuming transmission of the control channel.

These processings can also be performed by a digital signal processor (DSP) within base station 1000, which is not shown, based on software according to the flow chart shown in FIG. 8. The DSP reads a program including each step of the flow chart shown in FIG. 8 from a memory, which is not shown, and executes the same. This program can also be downloaded from a center, which is not shown, via a public circuit.

It is assumed that, if any of the slots for three traffic channels is empty, channel allocation computing unit 70 of base station 1000 allocates this empty slot to a new user when there is a link channel (LCH) establishment request.

Referring to FIG. 8, on the other hand, when the processing is started while all of the three traffic channels are in use (step S200), a determination is made if a link channel establishment request exists (step S202). If the LCH establishment request is not received, rejection of link channel allocation is transmitted (step S218). If the LCH establishment request is received, however, a determination is made as to whether the traffic slot for the control channel can be used as a traffic slot (step S204). As this determination method has been described associated with the first embodiment with reference to FIG. 4 (steps S108, 112), the description thereof will not be repeated.

If the allocation of the control channel to the traffic channel is not possible with current timing or the like, channel allocation computing unit 70 transmits rejection of link channel allocation (step S218).

On the other hand, if the control channel can be allocated to the traffic channel, transmission of control channel CCH from base station 1000 is stopped, and information that will be necessary for base station 1000 to resume the transmission of control channel CCH, such as a slot number of control channel CCH and transmission timing of a frame at the time just before the switching to the traffic channel, is stored in store unit 60. Then, base station 1000 transmits allocation of the link channel to control channel CCH to the terminal which transmitted the link channel allocation request to allocate the slot of the control channel to the traffic slot (step S206).

Thereafter, control unit 40 and channel allocation computing unit 70 are set to standby states while monitoring an occurrence of an empty slot (step S208).

When an empty slot occurs (step S208), a determination is made as to whether the empty slot is the one that was previously used for transmission of the signal of the control channel (step S210).

If the empty slot was the one for the control channel signal, base station 1000 synchronizes with the peripheral base station based on information of the previously transmitted control channel to resume transmission of the signal of the control channel (step S212), and the processing is completed (step S216).

If the empty slot was not the one for the control channel signal, on the other hand, control unit 40 and channel allocation computing unit 70 first direct terminal PS of the user using the slot originally for the control channel to switch traffic channel TCH to the empty slot, as described in FIG. 7. Thereafter, base station 1000 synchronizes with the peripheral base station based on information of the previously transmitted control channel to resume transmission of the signal of the control channel (step S114), and the processing is completed (step S116).

As described above, according to the second embodiment of the present invention, utilization efficiency of radio wave can be enhanced because the number of terminals connectable to a base station can increase without degrading service quality to a terminal other than the terminals currently connecting to the base station in a mobile communication system wherein both a traffic channel and a control channel exist within one frame. In addition, service of the base station can be enhanced by returning to the original channel allocation state when the number of calling terminals decreases.

[Third Embodiment]

Figure 9:
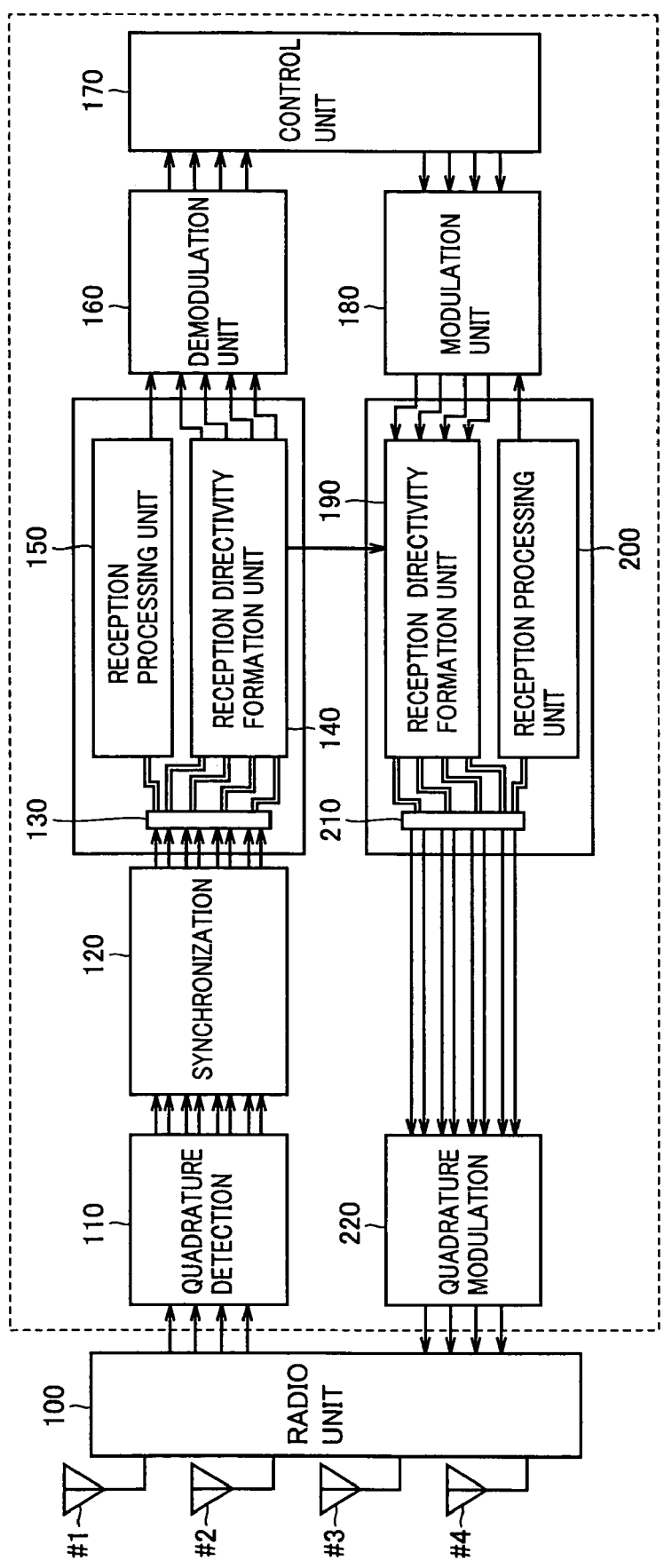
FIG. 9 is a schematic block diagram showing a configuration of an adaptive array base station 2000 according to a third embodiment of the present invention.

FIG. 9 is a schematic block diagram showing a configuration of an adaptive array base station 2000 according to a third embodiment of the present invention. In the following description, adaptive array base station 2000 according to the present invention can also be applied to SDMA system which can communicate with a spatial multiple access as described above, as long as the conditions of the number of antennas and the multiplicity of spatial multiplexing are met.

Referring to FIG. 9, adaptive array base station 2000 includes an array antenna formed with a plurality of antennas such as antennas #1–#4. The number of antennas can be made larger or smaller as required.

Antennas #1–#4 are respectively connected to a radio unit 100.

During reception, signals received at antennas #1–#4 are fed to a quadrature detection unit 110 via radio unit 100. In quadrature detection unit 110, the each received signal is divided into an in-phase detection axis signal and a quadrature detection axis signal, and each signal is converted to a digital signal by an A/D converter (not shown). Each of the in-phase detection axis signal and quadrature detection axis signal is then fed to a synchronization processing unit 120, and fed to a switching unit 130 after synchronization processing is performed.

As will be described below, when the slot of control channel CCH is not allocated to a traffic channel, switching unit 130 feeds the signals from antennas #1–#4 to reception directivity formation unit 140. When the slot of control channel CCH is allocated to a traffic channel, on the other hand, switching unit 130 feeds a signal from antenna #1 out of antennas #1–#4, for example, to a reception processing unit 150, and feeds signals from antennas #2–#4 to reception directivity formation unit 140, at least for the slot which was originally for the control channel.

In reception directivity formation unit 140, a signal of each user is separated and extracted by adaptive array processing controlled by a control unit 170. When a signal from antenna #1 is fed to reception processing unit 150, required processing is performed to this signal prior to demodulation processing of the control signal.

The signal from reception processing unit 150 and the received signal of each user separated and extracted in reception directivity formation unit 140 are fed to demodulation unit 160. Therein, required demodulation processing and time-division processing are performed to reconstruct the original signal, and the result is output to a public network (not shown).

When a link channel (LCH) establishment request is received from a terminal, control unit 170 determines whether there is an empty traffic channel or whether control channel CCH can be allocated as a traffic channel.

During transmission, on the other hand, a transmission signal provided from the public network (not shown) is fed to a modulation unit 180 via control unit 170, and therein required time-division processing and modulation processing are performed. A signal from modulation unit 180 is fed to a transmission directivity formation unit 190 and a transmission processing unit 200.

In transmission directivity formation unit 190, down-link transmission directivity is controlled to a transmission signal by the adaptive array processing. Herein, when the slot of control channel CCH is not allocated to a traffic channel, transmission directivity is produced to signals for four antennas #1–#4. When the slot of control channel CCH is allocated to a traffic channel, on the other hand, transmission directivity is produced to signals for antennas #2–#44 out of four antennas #1–#4, at least for the slot which was originally for the control channel. As will be described below, transmission directivity formation unit 200 performs such production processing of transmission directivity based on a weight vector from reception directivity formation unit 140.

Transmission processing unit 190 performs required processing to a control signal for control channel CCH prior to quadrature modulation when the slot of control channel CCH is allocated to a traffic channel.

When the slot of control channel CCH is not allocated to a traffic channel, switching unit 210 feeds the signal from transmission directivity formation unit 190 to quadrature modulation unit 220, and the signal produced by modulating the signal from transmission directivity formation unit 190 is fed to each of four antennas #1–#4. When the slot of control channel CCH is allocated to a traffic channel, on the other hand, switching unit 210 feeds the signal from transmission directivity formation unit 190 and the signal from transmission processing unit 200 to quadrature modulation unit 210. To antenna #1 of four antennas #1–#4, the signal produced by modulating the signal from transmission processing unit 200 is fed. To antennas #2–#4, the signal produced by modulating the signal from transmission directivity formation unit 190 is fed.

Therefore, directivity of transmission and reception is controlled using four antennas #1–#4 when the slot of control channel CCH is not allocated to a traffic channel, while directivity of transmission and reception is controlled using antennas #2–#4 out of four antennas #1–#4 when the slot of control channel CCH is allocated to a traffic channel.

Herein, the signal of control channel CCH is transmitted and received between base station 2000 and a terminal within the service area with radio wave having no directivity. Therefore, there will be no problem in providing services even when control channel CCH is shifted to the traffic channel in base station 2000 and when a terminal other than the terminals currently connecting to base station 2000 is to originate a new speech, because the terminal within the service area of base station 2000 can receive the control signal.

Figure 10:
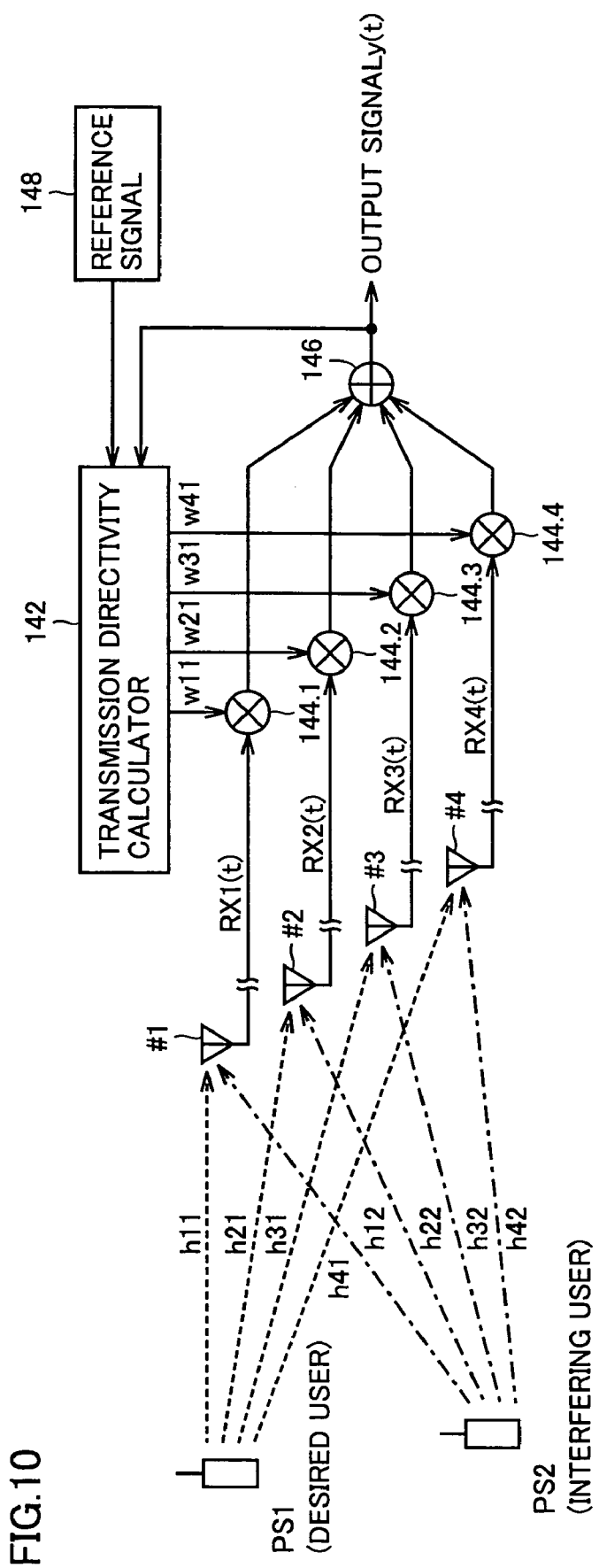
FIG. 10 is a block diagram showing a configuration of a part of a reception directivity formation unit 140 in base station 2000, which configuration corresponds to one user.

FIG. 10 is a block diagram showing a configuration of a part of reception directivity formation unit 140 in base station 2000 shown in FIG. 9, which configuration corresponds to one user.

First, operations are described when the slot of control channel CCH is not allocated to a traffic channel and the reception directivity is controlled using four antennas #1–#4.

In the example shown in FIG. 10, a signal from a desired user terminal PS1 is extracted from input signals including signals from terminals PS1 and PS2 of two users based on signals from four antennas #1–#4. That is, the signal from terminal PS2 acts as an interference wave.

Signals $RX_1$–$RX_4$ from four antennas #1–#4 are fed to a reception directivity calculator 142 and multipliers 144.1–144.4.

Reception directivity calculator 142 calculates weight vectors $w_{11}$–$w_{41}$ using input signal, reference signal previously stored in a memory 148, and output of an adder 146. Herein, the latter subscript "1" indicates that it is a weight vector used for transmission and reception with the first user PS1.

Thus, a signal sequence of preamble of the received signal includes a signal train of prescribed reference information. Reception directivity calculator 142 contrasts a reference signal (unique word signal) taken from memory 148 with the received signal sequence, and performs weight vector control (determination of weighting factor) so as to extract the signal which may contain the signal sequence corresponding to user terminal PS1.

Multipliers 144.1–144.4 multiply input signals $RX_1$–$RX_4$ and weight vectors $w_{1i}$–$w_{4i}$ respectively, and feed the results to adder 146. Adder 146 adds output signals of multipliers 144.1–144.4 and outputs the result as a received signal y1(t), which signal is also fed to reception directivity calculator 262.

[Operation Principle of Adaptive Array]

The signal fed to reception directivity formation unit 140 from each antenna is expressed as follows:

$$RX_1(t)=h_{11}Srx_1(t)+h_{12}Srx_2(t)+n_1(t) \quad (1)$$

$$RX_2(t)=h_{21}Srx_1(t)+h_{22}Srx_2(t)+n_2(t) \quad (2)$$

$$RX_3(t)=h_{31}Srx_1(t)+h_{32}Srx_2(t)+n_3(t) \quad (3)$$

$$RX_4(t)=h_{41}Srx_1(t)+h_{42}Srx_2(t)+n_4(t) \quad (4)$$

where a signal $RX_j(t)$ represents a received signal of a jth (=1, 2, 3, 4) antenna, and a signal $Srx_i(t)$ represents a signal transmitted from an ith (i= 1, 2) user.

Further, a coefficient $h_{ji}$ represents a complex factor of the signal from the ith user received by the jth antenna, and $n_j(t)$ represents noise included in the jth received signal.

The above equations (1) to (4) are expressed in vector forms as follows.

$$X(t)=H_1Srx_1(t)+H_2Srx_2(t)+N(t) \quad (5)$$

$$X(t)=[RX_1(t), RX_2(t), \ldots, RX_4(t)]^T \quad (6)$$

$$H_i=[h_{1i}, h_{2i}, \ldots, h_{4i}]^T, (i=1, 2) \quad (7)$$

$$N(t)=[n_1(t), n_2(t), \ldots, n_4(t)]^T \quad (8)$$

In the above equations (6) to (8), $[\ldots]^T$ shows transposition of $[\ldots]$.

Herein, X(t) represents an input signal vector, $H_i$ represents a received signal factor vector of the ith user, and N(t) represents a noise vector.

As shown in FIG. 10, the adaptive array antenna multiplies weighting factors $w_{1i}$–$w_{4i}$ to input signals from the respective antennas, and outputs the composite signal as received signal y1(t).

With the preparation as described above, the operation of the adaptive array to extract, for example, signal $Srx_1(t)$ transmitted by the first user will be as follows.

Output signal y1(t) of the adaptive array can be expressed by multiplying input signal vector X(t) and a vector of a weight vector $W_1$ as follows.

$$y1(t)=X(t)W_1^T \quad (9)$$

$$W_1=[w_{11}, w_{21}, w_{31}, w_{41}]^T \quad (10)$$

That is, weight vector $W_1$ has the weighting factor $w_{j1}$ (j=1, 2, 3, 4), which is multiplied to the jth input signal $RX_j(t)$, as its element.

Substitution of input signal vector X(t) expressed by the equation (5) into y1(t) expressed as the equation (9) gives the following equation.

$$y1(t)=H_1W_1^TSrx_1(t)+H_2W_1^TSrx_2(t)+N(t) W_1^T \quad (11)$$

When the adaptive array ideally operates, weight vector $W_1$ is sequentially controlled by reception directivity calculator 142 by the well-known method so as to satisfy the following simultaneous equations.

$$H_1W_1^T=1 \quad (12)$$

$$H_2W_1^T=0 \quad (13)$$

When weight vector $W_1$ is completely controlled to satisfy the equations (12) and (13), output signal y1(t) from the adaptive array is ultimately expressed as follows.

$$y1(t)=Srx_1(t)+N_1(t) \quad (14)$$

$$N_1(t)=n_1(t)w_{11}+n_2(t)w_{21}+n_3(t) w_{41} \quad (15)$$

Therefore, signal $Srx_1(t)$ transmitted from the first one of the two users is obtained in output signal y1(t).

Figure 11:
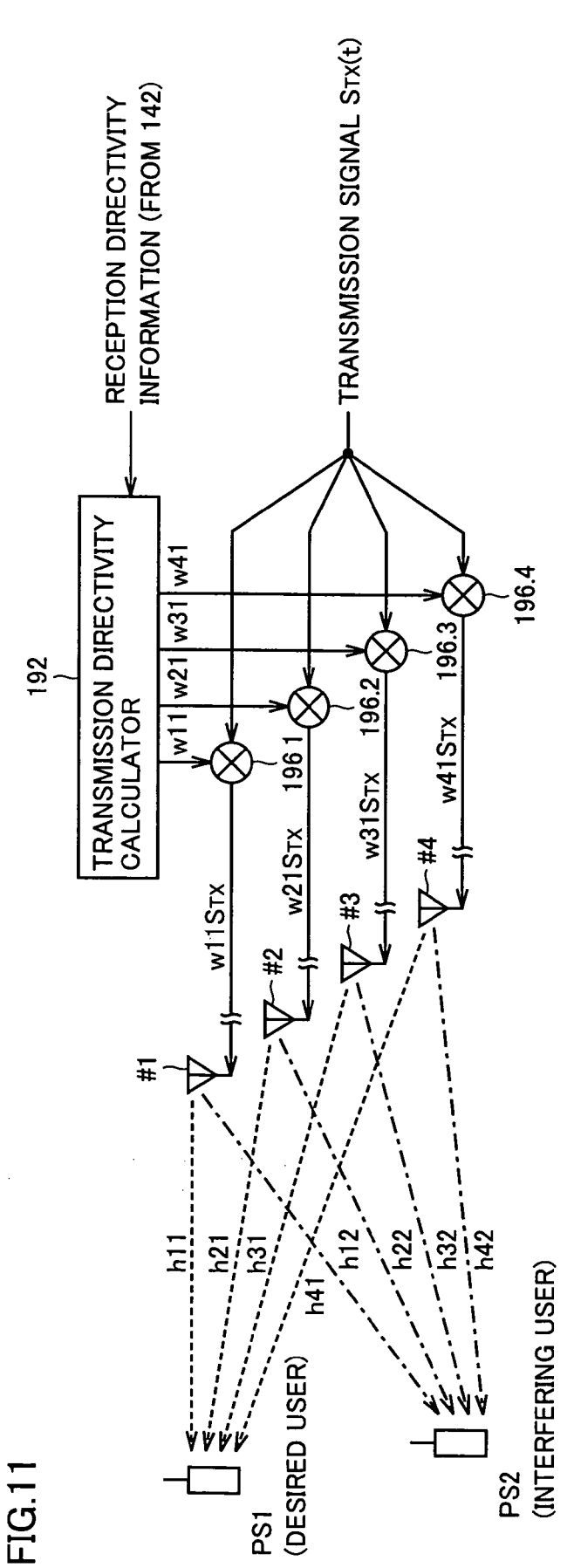
FIG. 11 is a block diagram showing a configuration of a part of a transmission directivity formation unit 190 in base station 2000, which configuration corresponds to one user.

FIG. 11 is a block diagram showing a configuration of a part of transmission directivity formation unit 190 in base station 2000 shown in FIG. 9, which configuration corresponds to terminal PS1 of one user.

Referring to FIG. 11, transmission directivity formation unit 190 includes a transmission directivity calculator 192 calculating weight vectors $w_{11}$–$w_{41}$ based on reception directivity information provided by reception directivity calculator 142, and multipliers 196.1–196.4 multiplying an output signal $S_{TX}(t)$ from modulation unit 180 to weight vectors $w_{11}$–$w_{41}$ respectively and outputting the results. Outputs $w_{11}S_{TX}(t)$–$w_{41}S_{TX}(t)$ of multipliers 196.1–196.4 are respectively fed to antennas #1–#4 after the quadrature modulation.

In principle, respective weight vectors $w_{11}$–$w_{41}$ fed to these multipliers are applied by copying weight vectors $w_{11}$–$w_{41}$ calculated by reception directivity calculator 142 based on the received signals, as described in FIG. 10. When it is detected that user terminal PS1 is moving, for example, the values may be corrected corresponding to the moving speed or the like.

With the processing as described above, transmission and reception of a signal having directivity with terminal PS1 becomes possible.

Furthermore, when the slot of control channel CCH is allocated to a traffic channel and the reception directivity is controlled using three antennas #2–#4, the processing is performed assuming signal $RX_1(t)$ as 0 in processing of reception, and signal $w_{11}S_{TX}(t)$ as 0 in processing of transmission.

Figure 12:
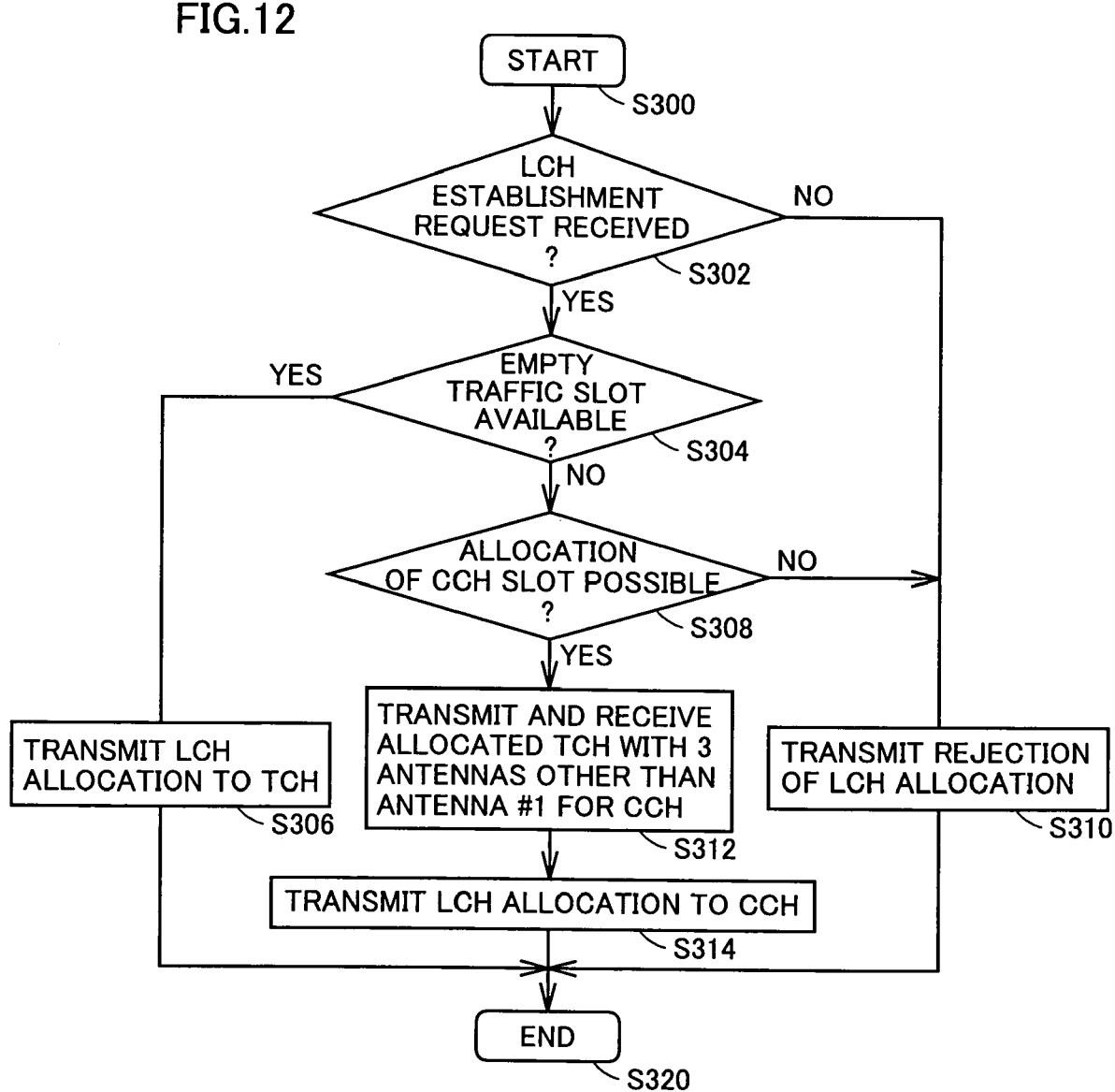
FIG. 12 is a flow chart showing operations executed by a control unit 170 of adaptive array base station 2000.
Figure 13:
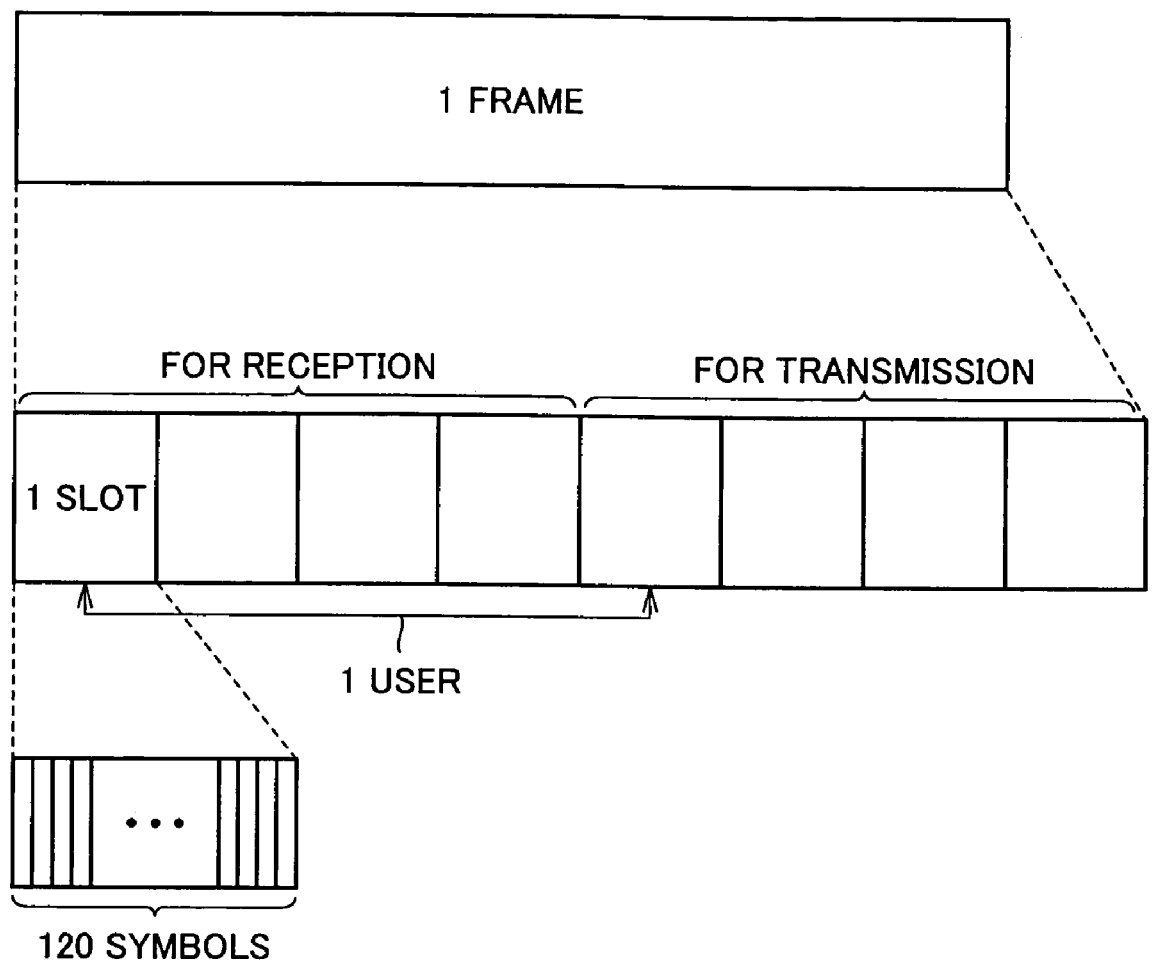
FIG. 13 is a schematic diagram showing a structure of a signal transmitted and received between a terminal and a PHS base station.
Figure 14:
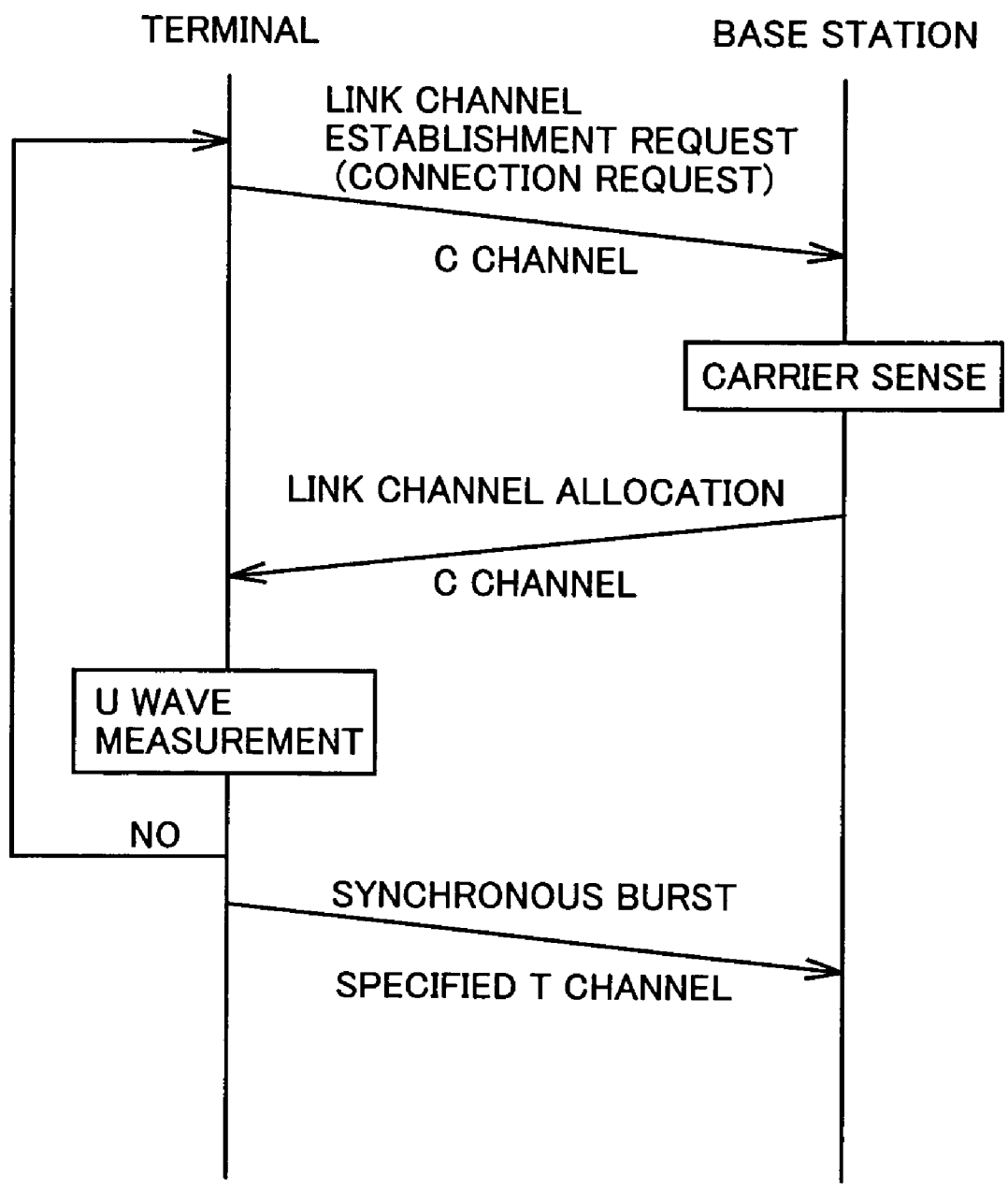
FIG. 14 is a diagram showing a traffic sequence flow.

FIG. 12 is a flow chart showing operations for channel allocation executed by control unit 40 of adaptive array base station 2000.

This processing can also be performed by a digital signal processor (DSP) within base station 2000, which is not shown, based on software according to the flow chart shown in FIG. 12. The DSP reads a program including each step of the flow chart shown in FIG. 12 from a memory, which is not shown, and executes the same. This program can also be downloaded from a center, which is not shown, via a public circuit.

Referring to FIG. 12, after the channel allocation processing is started (step S300), a determination is made as to whether a link channel (LCH) establishment request exists (step S302). If the LCH establishment request is not received, rejection of link channel allocation is transmitted (step S310). If the LCH establishment request is received, however, a determination is made as to whether an empty traffic slot exists (step S304).

If an empty traffic slot exists, an allocation of the link channel to traffic channel (TCH) is transmitted (step S306), and the allocation processing is completed (step S320).

On the other hand, if an empty traffic slot does not exist, then a determination is made as to whether the control channel can be allocated to the traffic channel in current timing or the like (step S308). If the allocation is not possible, rejection of link channel allocation is transmitted (step S310).

If the control channel can be allocated to the traffic channel, on the other hand, switching units 130 and 210 are controlled such that the allocated traffic channel TCH is transmitted and received with antennas #2–#4 other than antenna #1 for control channel CCH (step S112).

Thereafter, base station 2000 transmits allocation of the link channel to control channel CCH to the terminal which transmitted the link channel allocation request (step S314), and the processing is completed (step S320).

In the description above, three of the four antennas are used to control the directivity of transmission and reception, and the remaining one antenna transmits and receives the control signal when the slot of control channel CCH is allocated to a traffic channel. More generally, (n−m) (n, m: natural numbers) antennas out of n antennas may be used to control the directivity of transmission and reception, and the remaining m antenna(s) may transmit and receive the control signal when the slot of control channel CCH is allocated to a traffic channel.

As described above, according to the third embodiment of the present invention, utilization efficiency of radio wave can be enhanced without degrading service quality to a terminal other than the terminals currently calling a base station, because the number of terminals connectable to the base station can increase while maintaining a communication of a control channel in a mobile communication system wherein both a traffic channel and a control channel exist within one frame.

Industrial Applicability

The present invention is efficient in a mobile communication system wherein a plurality of terminals connect with a base station, because the number of terminals connectable to the base station can increase without degrading service quality to a terminal other than the terminals currently connecting to the base station.

What is claimed is:

1. An apparatus for a radio base station (1000) in a mobile communication system, wherein a signal transmitted and received in said mobile communication system is divided into a plurality of frames each including a control slot for transferring at least one control signal and a plurality of communication slots for information communication, said apparatus for a radio base station comprising:

reception level sensing means (50) for monitoring a signal level of a control slot from a peripheral base station; and channel allocation means (70) for allocating said control slot for said information communication in response to a sensing result of said reception level sensing means when a connection is requested from a terminal device.

2. The apparatus for a radio base station according to claim 1, wherein when there is no empty communication slot of said radio base station, said channel allocation means allocates said control slot for said information communication in response to a presence of at least a prescribed number of other peripheral base stations capable of receiving signal of said control slot, which presence is determined from a sensing result of said reception level sensing means.

3. The apparatus for a radio base station according to claim 1, wherein when there is no empty communication slot of said radio base station, said channel allocation means allocates said control slot for said information communication in response to a signal level of said control slot from another peripheral base station being equal to or higher than a prescribed value, which signal level is determined from a sensing result of said reception level sensing means.

4. A communication channel allocation method in an apparatus for a radio base station (1000) in a mobile communication system, wherein a signal transmitted and received in said mobile communication system is divided into a plurality of frames each including a control slot for transferring at least one control signal and a plurality of communication slots for information communication, said method comprising the steps of:

monitoring a signal level of a control slot from a peripheral base station; and allocating said control slot for said information communication in response to a sensing result of reception level when a connection is requested from a terminal device.

5. The communication channel allocation method according to claim 4, wherein
said allocating step includes the steps of
searching for an empty communication slot of said radio base station, and
allocating said control slot for said information communication in response to a presence of at least a prescribed number of other peripheral base stations capable of receiving signal of said control slot when there is no empty communication slot of said radio base station.

6. The communication channel allocation method according to claim 4, wherein
said allocating step includes the steps of
searching for an empty communication slot of said radio base station, and
allocating said control slot for said information communication in response to a signal level of said control slot from another peripheral base station being equal to or higher than a prescribed value when there is no empty communication slot of said radio base station.

7. A communication channel allocation program in an apparatus for a radio base station (1000) in a mobile communication system, wherein a signal transmitted and received in said mobile communication system is divided into a plurality of frames each including a control slot for transferring at least one control signal and a plurality of communication slots for information communication, said program making a computer execute the steps of:
monitoring a signal level of a control slot from a peripheral base station; and
allocating said control slot for said information communication in response to a sensing result of reception level when a connection is requested from a terminal device.

8. The communication channel allocation program according to claim 7, wherein
said allocating step includes the steps of
searching for an empty communication slot of said radio base station, and
allocating said control slot for said information communication in response to a presence of at least a prescribed number of other peripheral base stations capable of receiving signal of said control slot when there is no empty communication slot of said radio base station.

9. The communication channel allocation program according to claim 7, wherein
said allocating step includes the steps of
searching for an empty communication slot of said radio base station, and
allocating said control slot for said information communication in response to a signal level of said control slot from another peripheral base station being equal to or higher than a prescribed value when there is no empty communication slot of said radio base station.

10. An apparatus for a radio base station (1000) in a mobile communication system, wherein a signal transmitted and received in said mobile communication system is divided into a plurality of frames each including at least one control slot for transferring a control signal and a plurality of communication slots for information communication, said apparatus for a radio base station comprising:

reception level sensing means (50) for monitoring a signal level and reception timing of a control slot from a peripheral base station;
channel allocation means (70) for allocating said control slot for said information communication in response to a sensing result of said reception level sensing means when a connection is requested from a terminal device;
storing means (60) for storing a sensing result of said reception level sensing means when a connection is requested from said terminal device; and
control means (40) for resuming transmission of said control signal based on said sensing result stored in said storing means in response to an occurrence of an empty slot within said frame after said control slot is allocated for said information communication.

11. The apparatus for a radio base station according to claim 10, wherein
when said empty slot is said control slot, said control means synchronizes sending timing of a signal of said control slot with said peripheral base station based on said sensing result stored in said storing means to resume transmission of said control signal.

12. The apparatus for a radio base station according to claim 10, wherein
when said empty slot is not said control slot, said control means
i) reallocates a terminal performing said information communication in said control slot to said empty slot, and
ii) synchronizes sending timing of a signal of said control slot with said peripheral base station based on said sensing result stored in said storing means to resume transmission of said control signal.

13. A communication channel allocation method in an apparatus for a radio base station (1000) in a mobile communication system, wherein a signal transmitted and received in said mobile communication system is divided into a plurality of frames each including a control slot for transferring at least one control signal and a plurality of communication slots for information communication, said method comprising the steps of:
monitoring a signal level and reception timing of a control slot from a peripheral base station;
allocating said control slot for said information communication in response to the signal level of said control slot from said peripheral base station when a connection is requested from a terminal device;
storing the signal level and said reception timing of the control slot from said peripheral base station when a connection is requested from said terminal device; and
resuming transmission of said control signal based on the stored signal level and said reception timing of the control slot from said peripheral base station in response to an occurrence of an empty slot within said frame after said control slot is allocated for said information communication.

14. The communication channel allocation method according to claim 13, wherein
when said empty slot is said control slot, said resuming step includes the step of synchronizing sending timing of a signal of said control slot with said peripheral base station based on the stored signal level and said reception timing of the control slot from said peripheral base station to resume transmission of said control signal.

15. The communication channel allocation method according to claim 13, wherein when said empty slot is not said control slot, said resuming step includes the steps of
reallocating a terminal performing said information communication in said control slot to said empty slot, and
synchronizing sending timing of a signal of said control slot with said peripheral base station based on said sensing result stored in said storing means to resume transmission of said control signal.

16. A communication channel allocation program in an apparatus for a radio base station (1000) in a mobile communication system, wherein a signal transmitted and received in said mobile communication system is divided into a plurality of frames each including a control slot for transferring at least one control signal and a plurality of communication slots for information communication, said program making a computer execute the steps of:
monitoring a signal level and reception timing of a control slot from a peripheral base station;
allocating said control slot for said information communication in response to the signal level of said control slot from said peripheral base station when a connection is requested from a terminal device;
storing the signal level and said reception timing of the control slot from said peripheral base station when a connection is requested from said terminal device; and
resuming transmission of said control signal based on the stored signal level and said reception timing of the control slot from said peripheral base station in response to an occurrence of an empty slot within said frame after said control slot is allocated for said information communication.

17. The communication channel allocation program according to claim 16, wherein
when said empty slot is said control slot, said resuming step includes the step of synchronizing sending timing of a signal of said control slot with said peripheral base station based on the stored signal level and said reception timing of the control slot from said peripheral base station to resume transmission of said control signal.

18. The communication channel allocation program according to claim 16, wherein
when said empty slot is not said control slot, said resuming step includes the steps of
reallocating a terminal performing said information communication in said control slot to said empty slot, and
synchronizing sending timing of a signal of said control slot with said peripheral base station based on said sensing result stored in said storing means to resume transmission of said control signal.

19. An apparatus for a radio base station (2000) in a mobile communication system, wherein a signal transmitted and received in said mobile communication system is divided into a plurality of frames each including at least one control slot for transferring a control signal and a plurality of communication slots for information communication, said apparatus for a radio base station comprising:
a plurality of antennas (#1–#4);
reception directivity control means (140) for separating a signal from a desired terminal device by adaptive array processing based on signals from said plurality of antennas; and
control means (170) for allocating said control slot for said information communication when connections are requested from terminal devices that are equal to or larger in number than the capacity of said communication slot, wherein
when said control slot is allocated for said information communication, said reception directivity control means controls reception directivity with a prescribed number of said plurality of antennas, and receives said control signal with the remaining antenna or antennas.

20. The apparatus for a radio base station according to claim 19, further comprising
transmission directivity control means (190) for producing a transmission signal having directivity for a desired terminal device by adaptive array processing, wherein
when said control slot is allocated for said information communication, said transmission directivity control means controls transmission directivity with a prescribed number of said plurality of antennas, and transmits said control signal with the remaining antenna or antennas.

21. A communication channel allocation method in an apparatus for a radio base station (2000) transmitting and receiving a signal having directivity with a desired terminal device by adaptive array processing based on signals from a plurality of antennas (#1–#4) in a mobile communication system, wherein a signal transmitted and received in said mobile communication system is divided into a plurality of frames each including a control slot for transferring at least one control signal and a plurality of communication slots for information communication, said method comprising the steps of:
allocating said control slot for said information communication in response to a signal level of said control slot from a peripheral base station when a connection is requested from a terminal device; and
controlling transmission and reception directivity with a prescribed number of said plurality of antennas while receiving said control signal with the remaining antenna or antennas when said control slot is allocated for said information communication.

22. A communication channel allocation program in an apparatus for a radio base station (2000) transmitting and receiving a signal having directivity with a desired terminal device by adaptive array processing based on signals from a plurality of antennas (#1–#4) in a mobile communication system, wherein a signal transmitted and received in said mobile communication system is divided into a plurality of frames each including a control slot for transferring at least one control signal and a plurality of communication slots for information communication, said program making a computer execute the steps of:
allocating said control slot for said information communication in response to a signal level of said control slot from a peripheral base station when a connection is requested from a terminal device; and
controlling transmission and reception directivity with a prescribed number of said plurality of antennas while receiving said control signal with the remaining antenna or antennas when said control slot is allocated for said information communication.

* * * * *